US012080458B2

(12) United States Patent
Suetsuna et al.

(10) Patent No.: US 12,080,458 B2
(45) Date of Patent: Sep. 3, 2024

(54) MAGNETIC COMPOSITE MATERIAL AND ROTATING ELECTRIC MACHINE

(71) Applicant: Kabushiki Kaisha Toshiba, Minato-ku (JP)

(72) Inventors: Tomohiro Suetsuna, Kawasaki (JP); Hiroaki Kinouchi, Shinagawa (JP); Takahiro Kawamoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 484 days.

(21) Appl. No.: 16/291,100

(22) Filed: Mar. 4, 2019

(65) Prior Publication Data

US 2020/0082963 A1 Mar. 12, 2020

(30) Foreign Application Priority Data

Sep. 12, 2018 (JP) ................................ 2018-170946

(51) Int. Cl.
*H01F 1/24* (2006.01)
*B22F 1/068* (2022.01)
(Continued)

(52) U.S. Cl.
CPC ................ *H01F 1/24* (2013.01); *B22F 1/068* (2022.01); *B22F 1/08* (2022.01); *B22F 1/102* (2022.01);
(Continued)

(58) Field of Classification Search
CPC .......... H01F 1/14741; H01F 1/24; H01F 1/28; C22C 38/10; C22C 49/00; C22C 2202/02;
(Continued)

(56) References Cited

U.S. PATENT DOCUMENTS 10,090,088 B2 10/2018 Suetsuna et al.
10,774,404 B2 * 9/2020 Suetsuna .................. B22F 9/04
(Continued)

FOREIGN PATENT DOCUMENTS

JP 52-6906 A 1/1977
JP 52-114905 A 9/1977
(Continued)

OTHER PUBLICATIONS

Halder, N., et al. "Separation of particle size and lattice strain in integral breadth measurements", Acta Cryst. 20, 1966, pp. 312-313.

*Primary Examiner* — Adil A. Siddiqui
(74) *Attorney, Agent, or Firm* — Oblon, McClelland, Maier & Neustadt, L.L.P.

(57) ABSTRACT

The magnetic composite material of the embodiments is a magnetic composite material that includes a magnetic material having a plane at the surface; and a plate-shaped reinforcing material, the magnetic material having a plurality of magnetic bodies having a planar structure and having a magnetic metal phase containing at least one first element selected from the group consisting of iron (Fe), cobalt (Co), and nickel (Ni), and principal surfaces; and an intercalated phase containing at least one second element selected from the group consisting of oxygen (O), carbon (C), nitrogen (N), and fluorine (F). In the magnetic composite material, the principal surfaces are oriented to be approximately parallel to the plane and have the difference in coercivity on the basis of direction within the plane.

12 Claims, 23 Drawing Sheets

(51) Int. Cl.

| | |
|---|---|
| ***B22F 1/08*** | (2022.01) |
| ***B22F 1/102*** | (2022.01) |
| ***B22F 1/16*** | (2022.01) |
| ***B22F 3/02*** | (2006.01) |
| ***B22F 3/24*** | (2006.01) |
| ***C21D 6/00*** | (2006.01) |
| ***C21D 8/02*** | (2006.01) |
| ***C21D 9/52*** | (2006.01) |
| ***C22C 38/10*** | (2006.01) |
| ***H01F 1/147*** | (2006.01) |
| ***H01F 1/28*** | (2006.01) |

(52) U.S. Cl.
CPC ............ *B22F 1/16* (2022.01); *H01F 1/14741* (2013.01); *B22F 3/02* (2013.01); *B22F 3/24* (2013.01); *C21D 6/007* (2013.01); *C21D 6/008* (2013.01); *C21D 8/0205* (2013.01); *C21D 8/0247* (2013.01); *C21D 9/52* (2013.01); *C22C 38/10* (2013.01); *H01F 1/28* (2013.01)

(58) Field of Classification Search
CPC .......... B22F 3/02; B22F 3/24; B22F 2202/05; B22F 2999/00; B22F 1/02; B22F 7/064; B22F 7/08; B22F 1/0055; C21D 6/008; C21D 8/0205; C21D 8/0247; C21D 9/52; C21D 6/007
See application file for complete search history.

(56) References Cited

U.S. PATENT DOCUMENTS

| | | | | |
|---|---|---|---|---|
| 2010/0047547 | A1 | 2/2010 | Shimizu | |
| 2010/0219928 | A1* | 9/2010 | Alakula | B29C 41/045 336/221 |
| 2013/0249662 | A1 | 9/2013 | Tonoyama et al. | |
| 2014/0209691 | A1* | 7/2014 | Finn | H05K 1/0233 235/492 |
| 2017/0076845 | A1* | 3/2017 | Suetsuna | H01F 1/28 |
| 2018/0258513 | A1 | 9/2018 | Suetsuna et al. | |

FOREIGN PATENT DOCUMENTS

| | | | |
|---|---|---|---|
| JP | 59-92738 | A | 5/1984 |
| JP | 4-62805 | | 2/1992 |
| JP | 4-289746 | A | 10/1992 |
| JP | 5-22885 | A | 1/1993 |
| JP | 7-227503 | A | 8/1995 |
| JP | 2001-94015 | | 4/2001 |
| JP | 2001-126904 | | 5/2001 |
| JP | 2005-184916 | A | 7/2005 |
| JP | 2009-9985 | A | 1/2009 |
| JP | 2010-50254 | | 3/2010 |
| JP | 2013-201374 | | 10/2013 |
| JP | 2017-59816 | | 3/2017 |
| JP | 2018-152449 | | 9/2018 |

* cited by examiner

LONGITUDINAL DIRECTION
50
10a
4a
$20a_1$
2a
7a
12
7b
12
10b
4b
2b
$20b_1$ $20a_1$
12
7a
$\theta_1$
2a $20a_2$
12
7b
$\theta_2$
2b

DIAGRAM AS VIEWED FROM TOP (FLAT SURFACES OF FLAKY MAGNETIC METAL PARTICLES)

EXEMPLARY CONCEPTUAL CROSS-SECTIONAL VIEW OF STATOR

EXEMPLARY CONCEPTUAL CROSS-SECTIONAL VIEW DIAGRAM OF ROTOR

MAGNETIC COMPOSITE MATERIAL AND ROTATING ELECTRIC MACHINE

CROSS-REFERENCE TO RELATED APPLICATION

This application is based upon and claims the benefit of priority from Japanese Patent Application No. 2018-170946, filed on Sep. 12, 2018, the entire contents of which are incorporated herein by reference.

FIELD

Embodiments described herein relate generally to a magnetic composite material and a rotating electric machine.

BACKGROUND

Currently, soft magnetic materials are applied to the component parts of various systems and devices, such as rotating electric machines (for example, motors and generators), potential transformers, inductors, transformers, magnetic inks, and antenna devices. Thus, soft magnetic materials are regarded as very important materials. In these component parts, the real part of the magnetic permeability (real part of the relative magnetic permeability), μ', of a soft magnetic material is utilized, and therefore, in the case of actual use, it is preferable to control μ' in accordance with the working frequency band. Furthermore, in order to realize a highly efficient system, it is preferable to use a material having a loss that is as low as possible. That is, it is preferable to make the imaginary part of the magnetic permeability (imaginary part of the relative magnetic permeability), μ" (corresponding to a loss) as low as possible. In regard to the loss, the loss factor, tan δ (=μ"/μ'×100(%)) serves as a criterion, and as μ" becomes smaller relative to μ', the loss factor tan δ becomes smaller, which is preferable. In order to attain such conditions, it is preferable to make the core loss for the conditions of actual operation small, that is, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses are small, particularly under the operation conditions in which the effective magnetic field applied to the material is large, such as high current and high voltage. To attain this end, it is preferable that the saturation magnetization of a soft magnetic material is as large as possible so as not to bring about magnetic saturation. Furthermore, in recent years, since size reduction of equipment is enabled by utilization of high frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for a major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to magnetic wedges that are used in some motors, there is a demand for minimizing losses as far as possible. There is the same demand also for systems that use transformers. In motors, transformers and the like, the demand for size reduction is also high, along with efficiency enhancement. In order to realize size reduction, it is essential to maximize the magnetic permeability and saturation magnetization of the soft magnetic materials as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy saving and environmental protection has been actively advocated, and reduction of the amount of $CO_2$ emission and reduction of the dependency on fossil fuels have been required. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants with high efficiency, as environment-friendly power saving systems, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor, and a power diode; power supply circuits such as a linear regulator and a switching regulator; and a large-scale integration (LSI) logic circuit for power management to control the above-mentioned devices. Power semiconductor devices are widely used in all sorts of equipment including home electrical appliances, computers, automobiles and railways, and since expansion of the supply of these applied apparatuses, and an increase in the mounting ratio of power semiconductor devices in these apparatuses can be expected, a rapid growth in the market for power semiconductor devices in the future is anticipated. For example, inverters that are installed in many home electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, high magnetic permeability and low magnetic loss in the driving frequency bands, as well as high saturation magnetization that can cope with a large electric current are preferable. In a case in which saturation magnetization is high, it is difficult to induce magnetic saturation even if a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to high frequency communication equipment devices such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder body is more preferable than materials having a sheet shape or a ribbon shape. However, generally, when a pressed powder body is used, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Highly characterized materials ranging from non-directional silicon steel sheets to directional silicon steel sheets can be obtained, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder bodies that are applicable to complex shapes; however, pressed powder bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder bodies of Fe-based or Co-based amorphous glass, and MnZn-based ferrite materials. However, all of these materials do not completely satisfy characteristics such as high magnetic permeability, low losses, high saturation magnetization, high thermal stability, high strength, high toughness, and high hardness, and the materials are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

In view of the circumstances described above, it is preferable to develop a magnetic material having high saturation magnetization, high magnetic permeability, low losses, high thermal stability, and excellent mechanical characteristics. From such a viewpoint, we have suggested a pressed powder material formed from a plurality of magnetic bodies having a planar structure with principal surfaces (for example, flaky magnetic particles can be mentioned), and an intercalated phase. However, in regard to this pressed powder material, it has been made clearer that in a case in which the degree of orientation of the magnetic bodies is high, the mechanical characteristics (for example, flexural strength) vary depending on the direction. FIG. 1 is a schematic diagram illustrating the case of performing a three-point bending test for a bar-shaped magnetic material formed from flaky magnetic particles obtainable by the prior art technologies. When a three-point bending test is performed in three directions, namely, Direction 1, Direction 2, and Direction 3, it was found that the magnetic material has high strength in Direction 2 and Direction 3, while the strength is slightly decreased in Direction 1. It is speculated that in Direction 1, since the material is bent so as to be detached along the flat surfaces of the flaky magnetic particles, the strength is slightly decreased. That is, in an oriented type pressed powder material that uses flaky magnetic particles, the mechanical characteristics vary depending on the direction, and thus it is preferable to make improvements in a direction with inferior mechanical characteristics.

DETAILED DESCRIPTION

Figure 1:
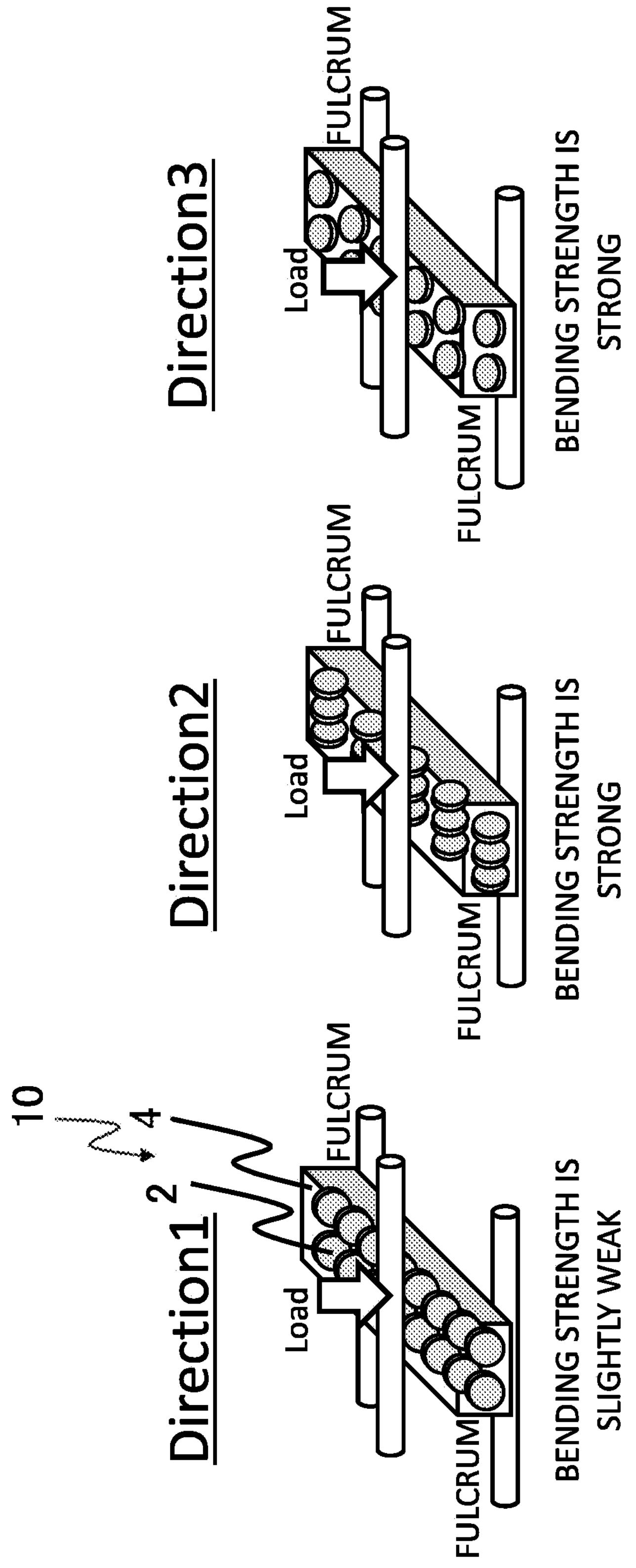
FIG. 1 is a schematic diagram illustrating the case of performing a three-point bending test for a bar-shaped magnetic material formed from flaky magnetic particles obtainable by the prior art technologies.

In the following description, embodiments will be described using the attached drawings. In the diagrams, identical or similar reference numerals will be assigned to identical or similar sites.

First Embodiment

A magnetic composite material of a first embodiment is a magnetic composite material including a magnetic material having a plane on the surface; and a plate-shaped reinforcing material, the magnetic material including a plurality of magnetic bodies having a planar type structure, each of the magnetic bodies having a magnetic metal phase containing at least one first element selected from the group consisting of iron (Fe), cobalt (Co), and nickel (Ni), and principal surfaces; and an intercalated phase containing at least one second element selected from the group consisting of oxygen (O), carbon (C), nitrogen (N), and fluorine (F), in which the principal surfaces are oriented to be approximately parallel to the plane and have the difference in coercivity on the basis of direction within the plane.

The magnetic composite material according to the first embodiment includes a plurality of magnetic bodies having a planar structure with principal surfaces. Regarding the magnetic body having a planar structure, the magnetic body includes at least one selected from the group consisting of a flaky particle, a thin band (ribbon), a thin film, a thick film, and a sheet-shaped material. A flaky particle is a flaky particle (or flattened particle) having a flaky shape (or flattened shape). A thin band (ribbon) refers to an object having a ribbon shape with a thickness of from about several micrometers (μm) to about one hundred micrometers (μm); a thin film refers to a thin film having a thickness of from about several nanometers (nm) to about 10 μm; a thick film refers to a thick film having a thickness of from about several micrometers (μm) to about several hundred micrometers (μm); and a sheet-shaped material refers to a sheet-shaped material having a thickness of from about one hundred micrometers (μm) to about several hundred millimeters (mm). However, it is not intended to strictly distinguish these objects, and their thicknesses may be slightly out of the defined thickness ranges. For all of them, it is preferable that the average length within the principal surface (defined as (a+b)/2, using the maximum length a and the minimum length b; the details will be described below) is larger than the thickness. The thickness ranges and distinctions described above have been suggested only as a reference, and whether the magnetic bodies should include any one of flaky particles, thin bands (ribbons), thin films, thick films, and sheet-shaped materials will be comprehensively decided based on information such as external appearance and shape.

It is preferable that the magnetic material included in the magnetic composite material according to the first embodiment is a pressed powder material. Furthermore, it is preferable that the magnetic bodies are flaky particles (flaky magnetic metal particles). It is preferable because the eddy current loss is suppressed thereby. Furthermore, in the case of a pressed powder material, it is preferable because the material has excellent mechanical strength.

Figure 2C:
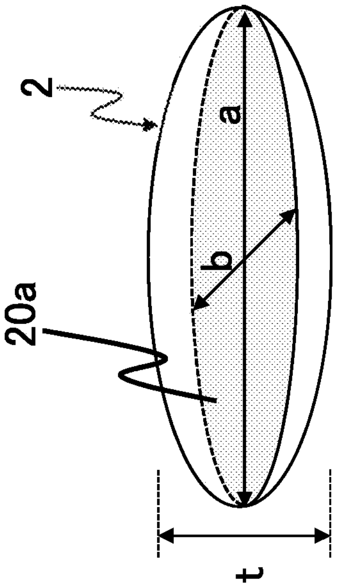
FIGS. 2A to 2D are schematic diagrams illustrating the principal surfaces of magnetic bodies according to a first embodiment.
Figure 2B:
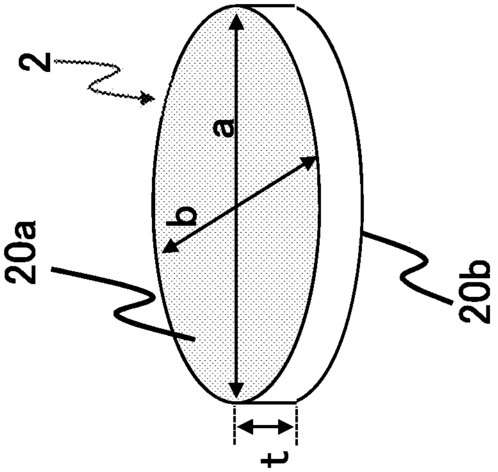
Figure 2A:
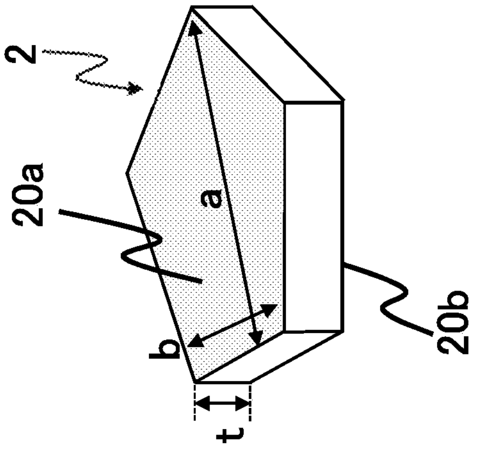
Figure 2D:
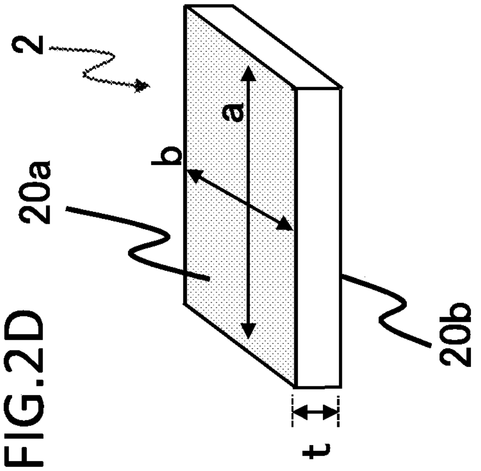

Furthermore, the "principal surface" in the magnetic body is a face corresponding to a plane in a planar structure. FIGS. 2A to 2D are schematic diagrams explaining the principal surfaces of magnetic bodies according to the first embodiment. For example, in the case of a polygonal column, a face having the largest area as illustrated in FIG. 2A, or a face opposite the foregoing face, is the principal surface. In the case of a polygonal column, a first face 20*a* or a second face 20*b* is the principal surface. In the case of a cylinder, the principal surface means the bottom face as illustrated in FIG. 2B. In the case of a cylinder, a first face 20*a* or a second face 20*b* is the principal surface. In the case of an oblate ellipsoid, a cross-section having the largest area as illustrated in FIG. 2C is the principal surface. In the case of an oblate ellipsoid, a first face 20*a* is the principal surface. In the case of a rectangular parallelepiped, the principal surface means a face having the largest area as illustrated in FIG. 2D. In the case of a rectangular parallelepiped, a first face 20*a* or a second face 20*b* is the principal surface. That is, in the case of a flaky particle, the principal surface refers to a flat surface (first flat surface); in the case of a thin band (ribbon) or a sheet, the principal surface refers to a sheet surface; and in the case of a thin film or a thick film, the principal surface refers to a film surface. In the polygonal column of FIG. 2A, the cylinder in FIG. 2B, and the oblate ellipsoid of FIG. 2C, a face having the largest area is designated as the first face 20*a*. Then, the second face 20*b* is defined as a face opposite the first face 20*a*. The principal surface is the first face 20*a* or the second face 20*b*.

In regard to the magnetic material, it is preferable that the principal surfaces of a plurality of the magnetic bodies are oriented approximately parallel to one another. Thereby, the magnetic permeability of the magnetic material is increased, and the eddy current loss is suppressed, which is preferable. Here, the term "(being) oriented" means a state in which the principal surfaces of magnetic bodies are approximately aligned in a particular direction. It is preferable that the average value of the angles formed by the principal surfaces of the magnetic bodies included in a magnetic material and a reference plane is in the range of ±20° or less. In regard to the method for determining a reference plane, ten or more magnetic bodies included in a magnetic material are observed by scanning electron microscopy (SEM) or the like, a representative (average) magnetic body that is oriented approximately in parallel as a whole is selected, and a plane parallel to the principal surface of the magnetic body thus selected is designated as a reference plane. Meanwhile, in the method for determining the reference plane, the measurer may arbitrarily determine the reference plane. In this case, it is preferable that the angle formed by the reference plane arbitrarily determined and a principal surface is determined, and whether the degree of variation of that angle is in the range of ±20° or less is determined.

The magnetic composite material also includes a magnetic material having a plane on the surface. Furthermore, the magnetic composite material has the difference in coercivity on the basis of direction within the plane.

When the phrase "having the difference in coercivity" is used, it is implied that when a magnetic field is applied in the direction of 360° within the plane and the coercivity is measured, there exist a direction in which maximum coercivity is obtained, and a direction in which minimum coercivity is obtained. For example, when the coercivity is measured by varying the direction at an interval of 22.5° over an angle range of 360° within the plane, the difference in coercivity is shown. That is, in a case in which there are an angle at which the coercivity becomes larger and an angle at which the coercivity becomes smaller, the state is defined by the phrase "having the difference in coercivity". When the magnetic material has the difference in coercivity within the plane, the minimum coercivity value becomes small compared to a material that is isotropic with almost no difference in coercivity, and this is preferable. As a result, the hysteresis loss is reduced, and the magnetic permeability is increased, which is preferable.

Coercivity can be evaluated using a vibrating sample magnetometer (VSM) or the like. In a case in which the coercivity is low, even a coercivity of 0.1 Oe or less can be measured using a low magnetic field unit. Measurement is made by varying the direction within the above-mentioned plane with respect to the direction of the magnetic field to be measured.

Within the plane, as the proportion of the difference in coercivity on the basis of direction is larger, it is more preferable, and it is preferable that the proportion is 1% or higher. The proportion of the difference in coercivity is more preferably 10% or higher, the proportion of the difference in coercivity is even more preferably 50% or higher, and the proportion of the difference in coercivity is still more preferably 100% or higher. The proportion of the difference in coercivity as used herein is defined by $(Hc(max)-Hc(min))/Hc(min)\times100(\%)$, using the maximum coercivity Hc(max) and the minimum coercivity Hc(min) within the plane.

In regard to the magnetic composite material, it is preferable that the material includes a plate-shaped reinforcing material 8.

It is preferable that the plate-shaped reinforcing material 8 is a material having excellent mechanical characteristics such as flexural strength. Furthermore, it is preferable that the reinforcing material 8 is a material having excellent heat resistance. A material having high electrical insulating properties and high electrical resistance is preferred. This is because the eddy current loss is suppressed. When the reinforcing material is a material having magnetic properties, it is more preferable because the magnetic characteristics of the magnetic composite material as a whole are enhanced. The material is not particularly limited; however, a thermoplastic resin, a thermosetting resin, a polyester-based resin, a vinyl ester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, and copolymers thereof are preferred. Particularly, in order to realize high thermal stability, it is preferable that the reinforcing material includes a silicone resin or a polyimide resin, which have high thermal resistance. Furthermore, in order to increase strength, materials such as fiber-reinforced plastics (FRP) having fibers such as glass fibers, aramid fibers (Kevlar fibers), carbon fibers, zylon fibers, polyethylene fibers (dyneema), or boron fibers mixed therein are also preferable.

Figures 3A, 3B:
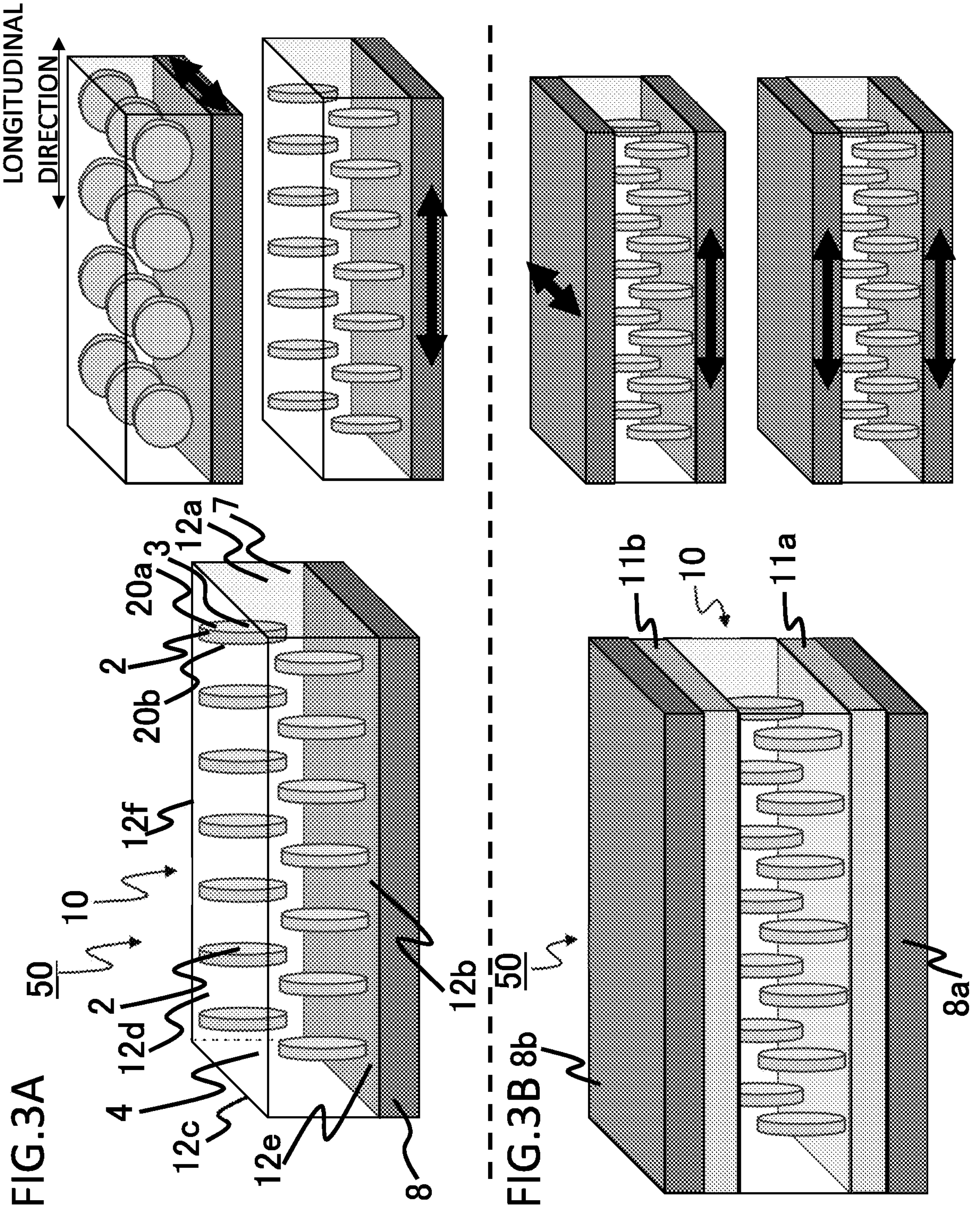
FIGS. 3A and 3B are schematic diagrams illustrating an example of the disposition of magnetic composite materials and reinforcing materials according to the first embodiment.

FIGS. 3A and 3B are schematic diagrams illustrating an example of the disposition of a magnetic composite material 50 and a reinforcing material 8 (first reinforcing material part 8*a* and second reinforcing material part 8*b*) according to the first embodiment. The reinforcing material (reinforcing material parts) may be disposed on one surface side of the magnetic material, or may be disposed on both surfaces. For the purpose of increasing the strength, it is preferable to dispose the reinforcing material on both surfaces; however, when the reinforcing material 8 is non-magnetic, or even though the reinforcing material has magnetic properties, if the amount of magnetic components is small, the amount of magnetic components of the magnetic composite material 50 as a whole becomes small. Therefore, the magnetic permeability is decreased, or the saturation magnetization is decreased, which is not preferable. Therefore, from the viewpoint of magnetism, it is preferable to dispose the reinforcing material only on one surface side; however, since the strength becomes poorer that in the case of disposing the reinforcing material on both surfaces, it is not preferable from the viewpoint of strength. A similar argument also applies to the thickness of the reinforcing material 8 to be disposed. When the thickness becomes larger, strength is increased; however, the magnetic characteristics are slightly deteriorated. When the thickness becomes smaller, the magnetic characteristics are enhanced; however, strength is slightly decreased. It is preferable to determine how a reinforcing material of what thickness should be disposed, based on the characteristics required for a system to which the magnetic material is to be applied.

In the left-hand side diagram of FIG. 3A, a plurality of magnetic bodies 2 is shown. Each of these magnetic bodies 2 has a magnetic metal phase 3, a first face (principal surface) 20*a*, and a second face (principal surface) 20*b*. The magnetic metal phase 3 will be described below. Furthermore, in the left-hand side diagram of FIG. 3A, an intercalated phase 4 is shown. The intercalated phase 4 will be described below. In FIGS. 3A and 3B, flaky particles (flaky magnetic metal particles) are recorded as the magnetic bodies 2; however, this is only an illustrative example, and the above-described magnetic bodies having a different structure (magnetic bodies having a planar surface with principal surfaces) may also be used. The same also applies to the following FIG. 5 to FIG. 10.

In the left-hand side diagram of FIG. 3A, a reinforcing material 8, a magnetic material 10, and a magnetic composite material 50 are shown. The shape of the magnetic material 10 is, for example, a rectangular parallelepiped as shown in the left-hand side diagram of FIG. 3A; however, the shape is not limited to a rectangular parallelepiped, and any shape having planes on the surface may be employed. In a case in which the magnetic material 10 is a rectangular parallelepiped, the magnetic material 10 has altogether six surfaces 12. In the left-hand diagram of FIG. 3A, surfaces 12*a*, 12*b*, 12*c*, 12*d*, 12*e*, and 12*f* are shown as the surfaces 12. Since the shape of the magnetic material 10 shown in the left-hand diagram of FIG. 3A is a rectangular parallelepiped, all of the six surfaces 12 carried by the magnetic material 10 become planes 7. The shape of the magnetic material 10 is not limited to this, and a cube, a cylinder, a trigonal pyramid, and the like may be considered. However, the magnetic material 10 has at least one plane 7 in which the magnetic bodies 2 are oriented, as a surface 12 (surface 12*a*). Also, a surface 12*b* (plane 7) and a plate-shaped reinforcing material 8 are in contact. Thereby, a magnetic composite material 50 having increased strength can be obtained. Then, it is preferable that a first face (principal surface) 20*a* or a second face (principal surface) 20*b* is oriented to be approximately parallel to the surface 12*a* (plane 7), and the magnetic composite material has the difference in coercivity on the basis of direction within the surface 12*a* (plane 7). Particularly, it is preferable that the surface 12 that comes into contact with the reinforcing material 8 (surface 12*b*), and the face (surface 12*a*) in which the first faces (principal surfaces) 20*a* or the second faces (principal surfaces) 20*b* are oriented, form different faces that adjoin each other at an edge of the rectangular parallelepiped, which is the shape of the magnetic material 10. In the magnetic material 10, since the strength in the direction along the face in which the first faces (principal surfaces) 20*a* or the second faces (principal surfaces) 20*b* are oriented is weak (corresponding to Direction 1 in FIG. 1), a disposition such as shown in the left-hand side diagram of FIG. 3A is preferred. Particularly, it is preferable that the surface 12 that adjoins the reinforcing material 8 (surface 12*b*) is approximately perpendicular to the face (surface 12*a*) in which the first faces (principal surfaces) 20*a* or the second faces (principal surfaces) 20*b* are oriented. At this time, in some of the magnetic bodies 2, the principal surface 20*a* (or 20*b*) may not be approximately perpendicular to the surface 12*b*; however, it is preferable that the principal surfaces are approximately perpendicular to the surface 12*b*. More preferably, it is preferable that the face parallel to the principal surfaces 20*a* (or 20*b*) of 50% or more of the magnetic bodies 2 is in the range of 40° or less, even more preferably in the range of 20° or less, and still more preferably in the range of 10° or less, with respect to a direction perpendicular to the surface 12*b*. Thereby, the strength of the magnetic composite material 50 is increased, and therefore, it is preferable.

In a case in which the expression "preferable that (it is) approximately perpendicular" is used in any sentence in the following description, the sentence is meant to similarly encompass the following matter: "preferable that (it is) approximately perpendicular. More preferably, it is preferable that 50% or more (of the magnetic bodies) are in the range of 40° or less, even more preferably in the range of 20° or less, and still more preferably in the range of 10° or less, with respect to a perpendicular direction". Furthermore, in a case in which the expression "preferable that (it is) approximately parallel" is used in a sentence, the sentence is meant to encompass the following matter: "preferable that (it is) approximately parallel. More preferably, it is preferable that 50% or more (of the magnetic bodies) are in the range of 40° or less, even more preferably in the range of 20° or less, and still more preferably in the range of 10° or less, with respect to a perpendicular direction".

Furthermore, it is similarly preferable that the dispositional relation between the reinforcing material 8 and the magnetic bodies 2 is a relation such as shown in the right-hand side diagram of FIG. 3A, in addition to the left-hand side diagram of FIG. 3A. Although not described in FIG. 3B, also in FIG. 3B, the case of the dispositional relation such as shown in the right-hand side diagram of FIG. 3A is similarly preferable.

In regard to the upper right diagram and the lower right diagram of FIG. 3A, it is preferable that the reinforcing material 8 has high resistance (high strength) against the bending stress in a direction perpendicular to the principal surface 20*a* (or 20*b*) (direction of the arrow described in the reinforcing material part in the upper right diagram and the lower right diagram of FIG. 3A). As a result, the strength of the magnetic composite material 50 is increased, and this is preferable.

Figures 16A, 16B:
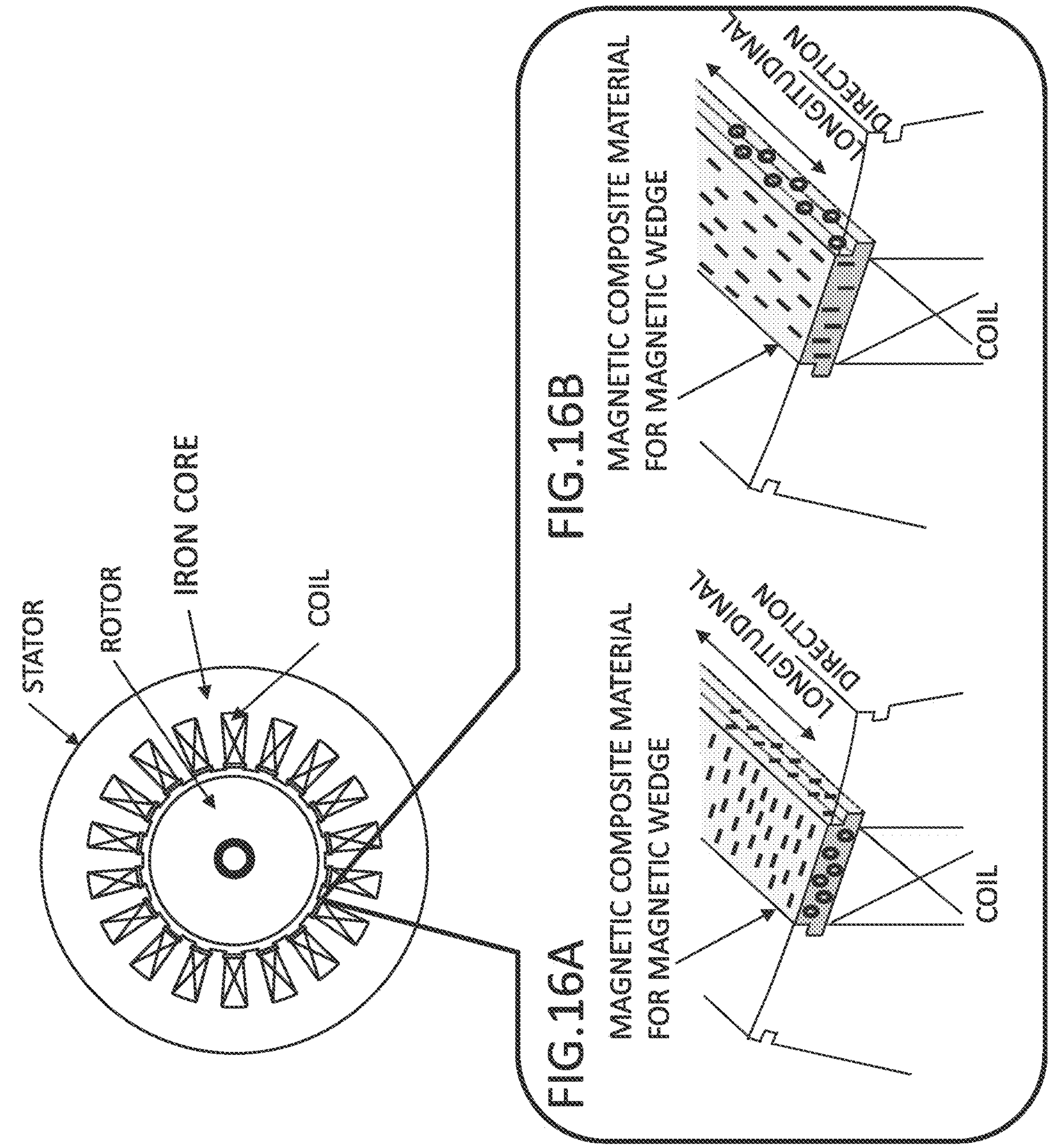
FIGS. 16A and 16B are schematic diagrams illustrating the directions of disposition of flaky magnetic metal particles in a case in which a magnetic composite material for a magnetic wedge is inserted into a radial gap type rotating electric machine in the second embodiment.
Figure 17:
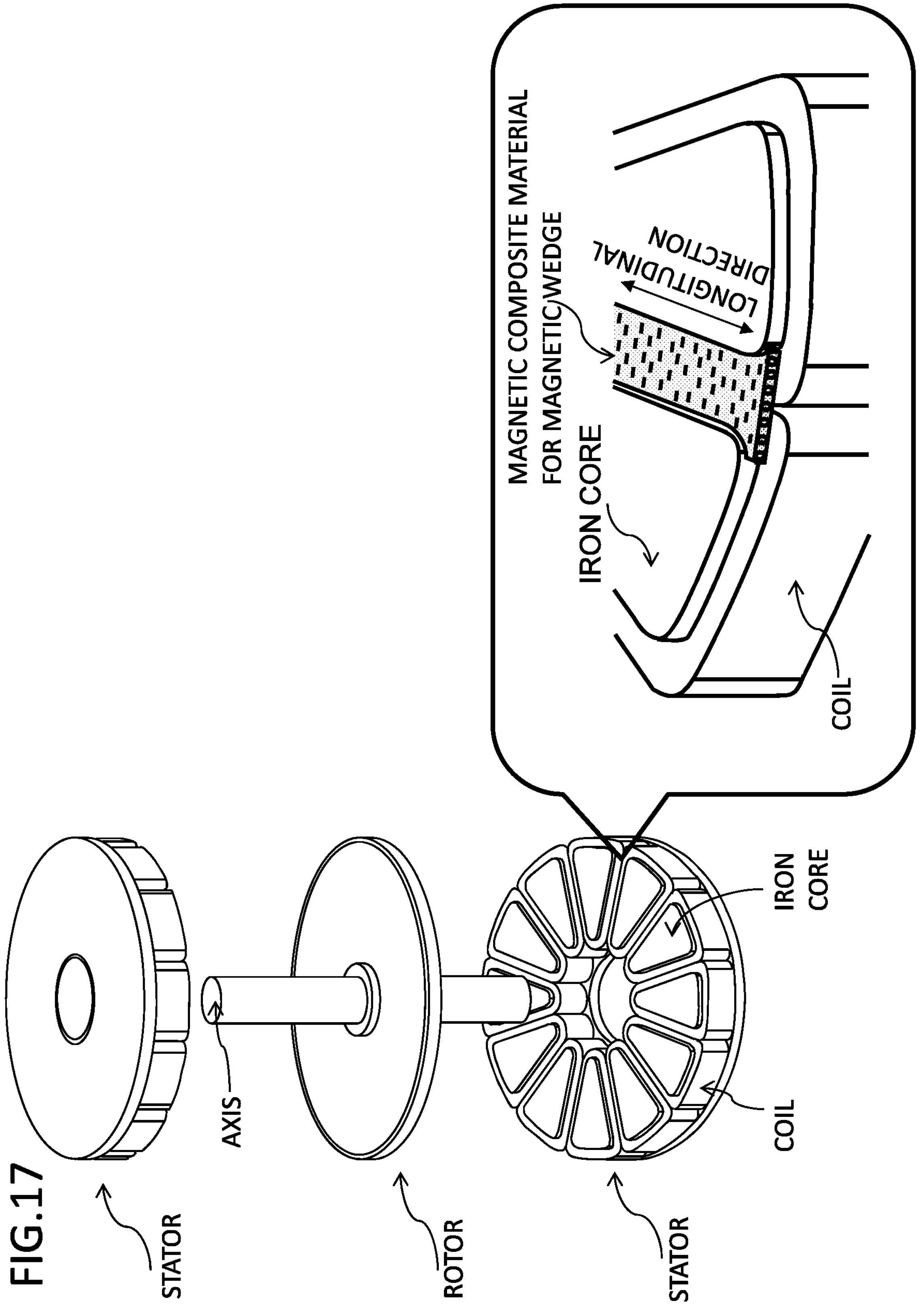
FIG. 17 is a schematic diagram illustrating the directions of disposition of flaky magnetic metal particles in a case in which a magnetic composite material for a magnetic wedge is inserted into an axial gap type rotating electric machine in the second embodiment.
Figure 18:
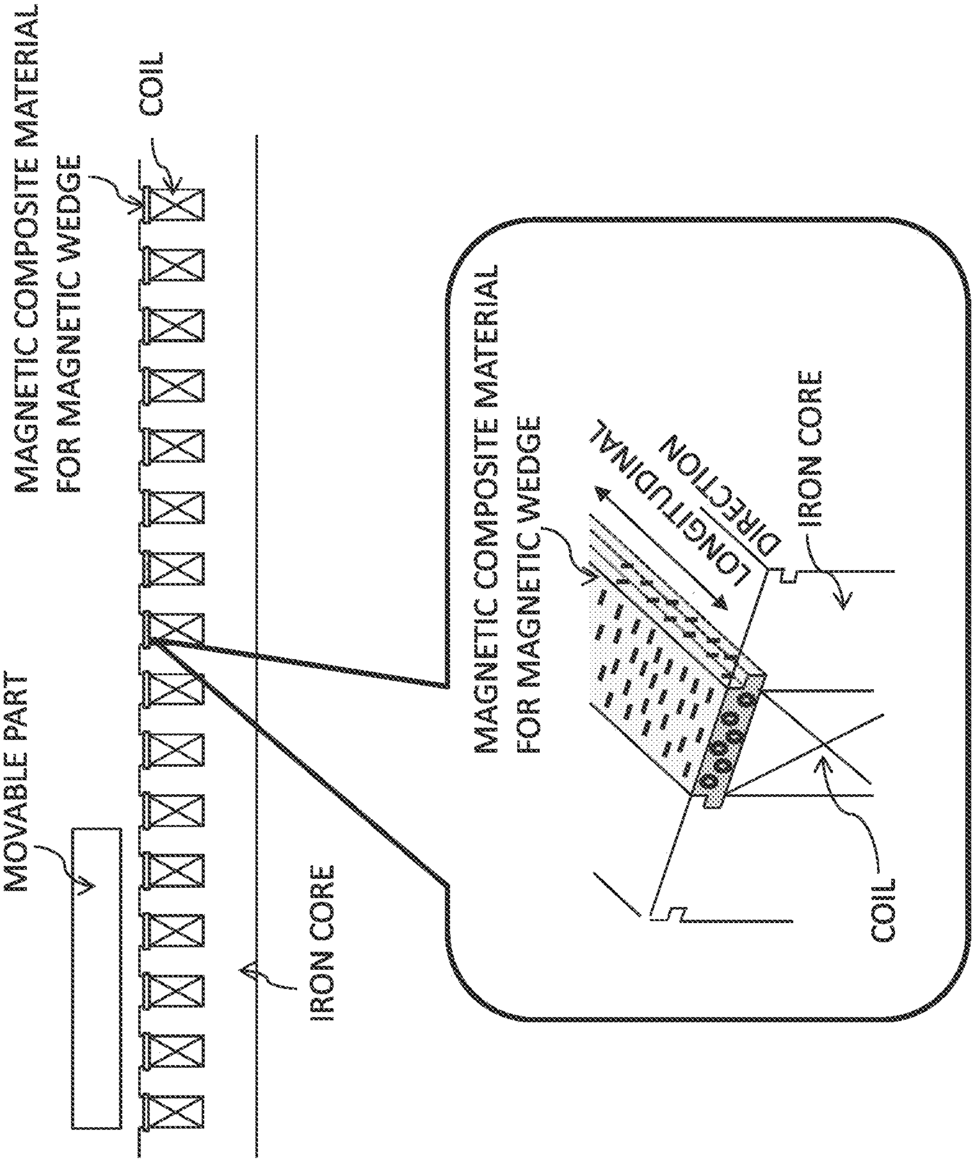
FIG. 18 is a schematic diagram illustrating the directions of disposition of flaky magnetic metal particles in a case in which a magnetic composite material for a magnetic wedge is inserted into a linear motor in the second embodiment.

In a case in which the reinforcing material 8 is disposed as shown in the left-hand side diagram and the upper right diagram of FIG. 3A, a magnetic composite material 50 having a rectangular parallelepiped shape (not necessarily limited to a rectangular parallelepiped shape) as an example is incorporated into a stator or a rotor of a rotating electric machine, and the magnetic composite material is used as magnetic wedges as shown in FIG. 16 to FIG. 18 that will be described below, it is preferable that as shown in FIG. 16 to FIG. 18, the longitudinal direction of the magnetic composite material 50, that is, a direction parallel to the longest edge of the rectangular parallelepiped (that is, the transverse direction on the paper plane of FIG. 3A and FIG. 3B), is inserted in (disposed) as the longitudinal direction of the magnetic wedge.

Furthermore, in a case in which the magnetic composite material is used as magnetic wedges as shown in FIG. 16 to FIG. 18, it is preferable that the reinforcing material 8 is disposed on a side far from the gap surface between the stator and the rotor. In other words, it is preferable that the magnetic material 10 is disposed between the gap surface and the reinforcing material 8. Since the reinforcing material 8 has weak magnetic properties (or is non-magnetic), when the reinforcing material 8 is disposed at a position close to the gap surface, the effects of the magnetic composite material 50 (effect as magnetic wedges; As a motor, effect of increasing the torque, or increasing the motor efficiency by reducing the harmonic loss) are weakened, which is not preferable. Therefore, it is preferable that the reinforcing material 8 is disposed on a side far from the gap surface.

FIG. 3B shows an example in which the reinforcing material 8 has a first reinforcing material part 8*a* and a second reinforcing material part 8*b*, and the magnetic material 10 is disposed between the first reinforcing material part 8*a* and the second reinforcing material part 8*b*. The first reinforcing material part 8*a* and the second reinforcing material part 8*b* are both the same members as the reinforcing material 8 shown in FIG. 3A. The first reinforcing material part 8*a* adjoins the surface 12*b*, and the second reinforcing material part 8*b* adjoins the surface 12*d*. It is preferable that the reinforcing material 8, the first reinforcing material part 8*a*, and the second reinforcing material part 8*b* are formed from the above-mentioned materials. 8*a* and 8*b* may be formed from the same material or may be formed from different materials. Furthermore, in FIG. 3B, it is particularly preferable that the reinforcing material 8 has a plate-like material having high resistance (high strength) against the bending stress in a direction perpendicular to the principal surface 20*a* (or 20*b*) That is, it is preferable to use a reinforcing material having high resistance (high strength) against the bending stress in the direction of the arrow described in the reinforcing material 8 in the upper right diagram and the lower right diagram of FIG. 3B. As a result, the strength of the magnetic composite material 50 is increased, which is preferable.

Furthermore, in a case in which the reinforcing material 8 is disposed as shown in FIG. 3B, the magnetic composite material 50 is incorporated into a stator or a rotor of a rotating electric machine, and the magnetic composite material is used as magnetic wedges as shown in FIG. 16 to FIG. 18 that will be described below, it is preferable that the longitudinal direction of the magnetic composite material 50, that is, a direction parallel to the longest edge of a rectangular parallelepiped (that is, transverse direction on the paper plane of FIGS. 3A and 3B), is inserted (disposed) as the longitudinal direction of the magnetic wedge, as shown in FIG. 16 to FIG. 18.

In a case in which the magnetic composite material is used as magnetic wedges as shown in FIG. 16 to FIG. 18, it is preferable that the thickness of the reinforcing material 8 on the side closer to the gap surface between the stator and the rotor is made relatively thinner. It is not necessary to have the same thickness for the reinforcing material parts 8*a* and 8*b*, and any one of them may be made relatively thinner. As described above, since the reinforcing material 8 has weak magnetic properties (or is non-magnetic), when the reinforcing material 8 is disposed in a large amount (to a large thickness) at a position close to the gap surface, the effects of the magnetic composite material 50 (effect as magnetic wedges. As a motor, effect of increasing torque, or increasing the motor efficiency by reducing the harmonic loss) are weakened, which is not preferable. Therefore, it is preferable to make the thickness of the reinforcing material on the side closer to the gap surface relatively thinner.

Meanwhile, an adhesive layer 11*a* is provided as an adhesive layer 11 between the first reinforcing material part 8*a* and the magnetic material 10, and an adhesive layer 11*b* is provided as the adhesive layer 11 between the second reinforcing material part 8*b* and the magnetic material 10. The adhesive layer 11 has a role of adhering to the reinforcing material 8 and the magnetic material 10 and fixing one another. Therefore, the strength of the magnetic composite material 50 is increased, which is preferable. Regarding the adhesive layer 11, it is preferable that the adhesive layer has high adhesive strength, and more preferably, it is preferable that the adhesive layer has high heat resistance. There are no limitations on the material; however, inorganic materials and organic materials may be used. Examples of the inorganic materials include sodium silicate-based materials, cement-based materials (Portland cement, original plaster, gypsum, magnesia cement, litharge cement, dental cement, and the like), ceramics, glass, phosphates, colloidal silica, and alkali metal silicates. Examples of the organic materials include starch-based materials (wheat starch, dextrin, rice paste, and the like), protein-based materials (animal glue, casein, soybean proteins, and the like), natural rubber-based materials (latex, rubber cement, and the like), asphalt-based materials, lacquer, thermoplastic resin-based materials (vinyl acetate resin-based (polyvinyl acetate-based), polyvinyl acetal-based, polyvinyl alcohol-based, ethylene-vinyl acetate resin-based, vinyl chloride resin-based (polyvinyl chloride-based), acrylic resin-based, polyacrylic acid ester-based, cyanoacrylate-based, ethylene copolymer-based, saturated polyester-based, polyamide-based, polyimide-based, cellulose-based, and olefin-based materials, and the like), thermosetting resin-based materials (urea resin-based, melamine resin-based, phenolic resin-based, urea resin-based, resorcinol resin-based, epoxy resin-based, acrylic resin-based, polyester-based, polyurethane-based, unsaturated polyester reactive acrylic-based, polyimide-based, and polyaromatic-based materials, and the like), and elastomer-based materials (chloroprene rubber-based, nitrile rubber-based, styrene-butadiene rubber-based, styrene-based block copolymer-based, polysulfide-based, butyl rubber-based, silicone-based, acrylic rubber-based, urethane rubber-based, silylated urethane resin-based, and telechelic polyacrylate-based materials, and the like). Particularly, in order to realize high thermal stability, it is preferable that the adhesive layer includes a silicone-based material or a polyimide-based material, which have high heat resistance. Meanwhile, the adhesive layer 11 is not necessarily needed.

In regard to the magnetic composite material 50 described in FIGS. 3A and 3B, as described above, the case of incorporating the magnetic composite material 50 into a stator or a rotor of a rotating electric machine and using the material as magnetic wedges as shown in FIG. 16 to FIG. 18 that will be described below, has been suggested as an example. Similarly to this, also in regard to the magnetic composite material 50 described in the following FIG. 4 to FIG. 10, the case of using the magnetic composite material 50 as magnetic wedges as shown in FIG. 16 to FIG. 18 that will be described below has been suggested as an example. In those cases, as shown in the respective drawings, it is preferable that the longitudinal direction of the magnetic composite material 50 is inserted (disposed) as the longitudinal direction of the magnetic wedge.

Figure 4A:
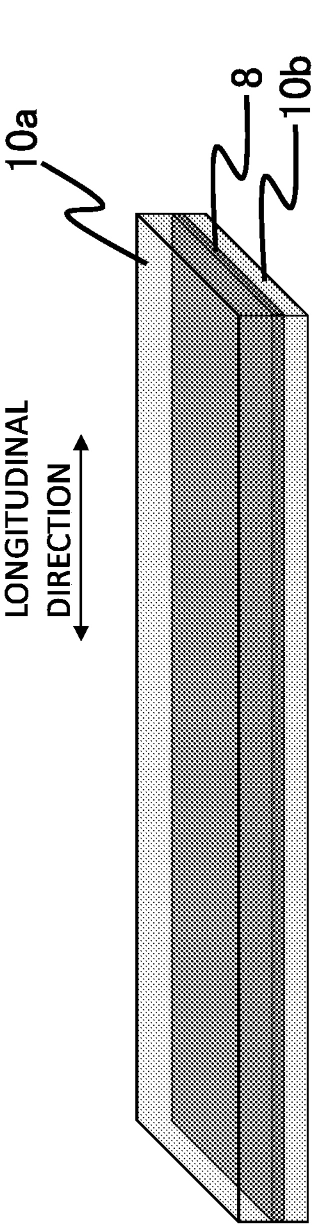
FIGS. 4A to 4C are schematic diagrams illustrating other examples of the disposition of the reinforcing material according to the first embodiment.
Figure 4B:
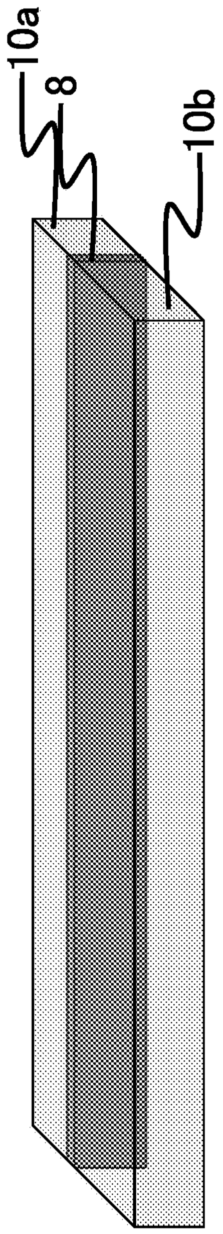
Figure 4C:
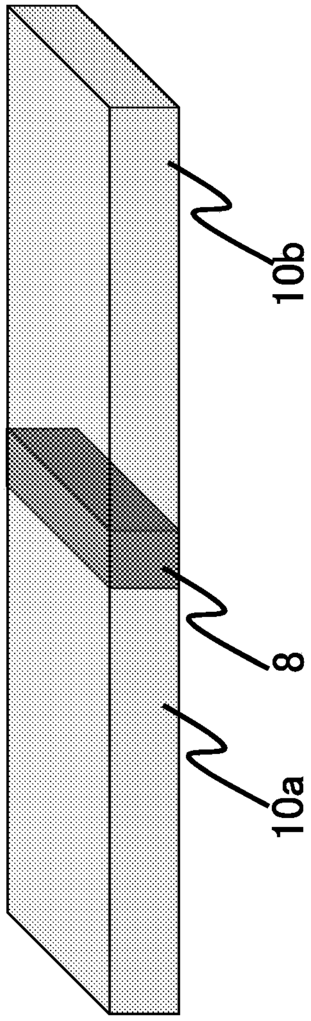

FIGS. 4A to 4C are schematic diagrams illustrating another example of disposition of the reinforcing material 8 according to the first embodiment. FIG. 4A and FIG. 4B show examples in which the reinforcing material 8 is disposed in a direction parallel to the longitudinal direction of the magnetic composite material 50, and FIG. 4C shows an example in which the reinforcing material 8 is disposed in a direction perpendicular to the longitudinal direction of the magnetic composite material 50. Meanwhile, in FIG. 4A, FIG. 4B, and FIG. 4C, only one reinforcing material 8 is disposed; however, a plurality of sheets of the reinforcing material 8 may be disposed. Furthermore, in FIG. 4A, FIG. 4B, and FIG. 4C, the reinforcing material 8 is disposed near the center; however, the position of disposition may not be the center (may be at any position). Furthermore, the examples shown in FIG. 4A, FIG. 4B, or FIG. 4C, and FIG. 3A or FIG. 3B may be employed singly or may be combined altogether. Meanwhile, the description of the magnetic bodies 2 is not given here. The direction of orientation of the magnetic bodies 2 may be any direction; however, as described above, when the surface 12 that adjoins the reinforcing material 8 (surface 12*b*) and the face in which the first faces (principal surfaces) 20*a* or the second faces (principal surfaces) 20*b* are oriented are approximately perpendicular to each other, it is more preferable because strength can be increased. Furthermore, in a case in which the magnetic composite material is used as magnetic wedges as shown in FIG. 16 to FIG. 18 that will be described below, the effects as magnetic wedges (as a motor, effect of increasing the torque, or increasing the motor efficiency by reducing the harmonic loss) are highly significant particularly in the case of FIG. 4B, and therefore, it is preferable. In this case, it is preferable that the reinforcing material 8 is non-magnetic or has a magnetic permeability lower than the magnetic permeability of the magnetic materials (first magnetic material 10*a* and second magnetic material 10*b*). Thereby, the magnetic flux leaking between the teeth in the motor can be reduced, and the magnetic flux can be efficiently guided from the stator toward the rotor side, which is preferable (high torque can be realized). On the other hand, when the width of the reinforcing material 8 becomes large, the quantity of the magnetic flux flowing toward the magnetic composite material 50 side is reduced. Therefore, the effect of reducing the harmonic loss (effect of increasing the motor efficiency) is reduced, and therefore, it is not preferable. From this point of view, it is preferable that the width of the reinforcing material 8 is small. Furthermore, even when the width of the reinforcing material 8 is the same, when the magnetic permeability of the reinforcing material 8 is lower than the magnetic permeability of the teeth, or the absolute quantity of the magnetic permeability of the reinforcing material 8 is small, the effect of reducing the magnetic flux leaking between the teeth becomes strong, and it is preferable (increased torque). However, on the other hand, the amount of the magnetic flux flowing toward the magnetic composite material 50 side is reduced, and the effect of reducing the harmonic loss (effect of increasing the motor efficiency) is reduced, which is not preferable. Therefore, regarding the width and magnetic permeability of the reinforcing material 8, it is desirable to determine the optimum width or magnetic permeability by conducting a comprehensive investigation from the viewpoints of both the increase in torque and the increase in efficiency.

The first magnetic material 10*a* and the second magnetic material 10*b* may be respectively distinguished at a clear interface; however, it is still acceptable that the materials (first magnetic material 10*a* and second magnetic material 10*b*) are disposed in a state in which the interface between the two materials is unclearly defined. Particularly, in a case in which a first intercalated phase part 4*a* and a second intercalated phase part 4*b* have the same composition, and a first magnetic body part 2*a* and a second magnetic body part 2*b* also have the same composition, it may be difficult to achieve strict distinction between the first magnetic material 10*a* and the second magnetic material 10*b*. However, it is preferable that an observation is made from a viewpoint of common knowledge, the place where the state of alignment of the magnetic body parts clearly changes is recognized as a boundary (interface), and the two materials are distinguished. The same also applies to the discussion on a plurality of magnetic materials, such as the first to fourth magnetic materials that will be described below.

Figures 5A, 5B, 5C, 5D, 5E, 5F, 5G, 5H:
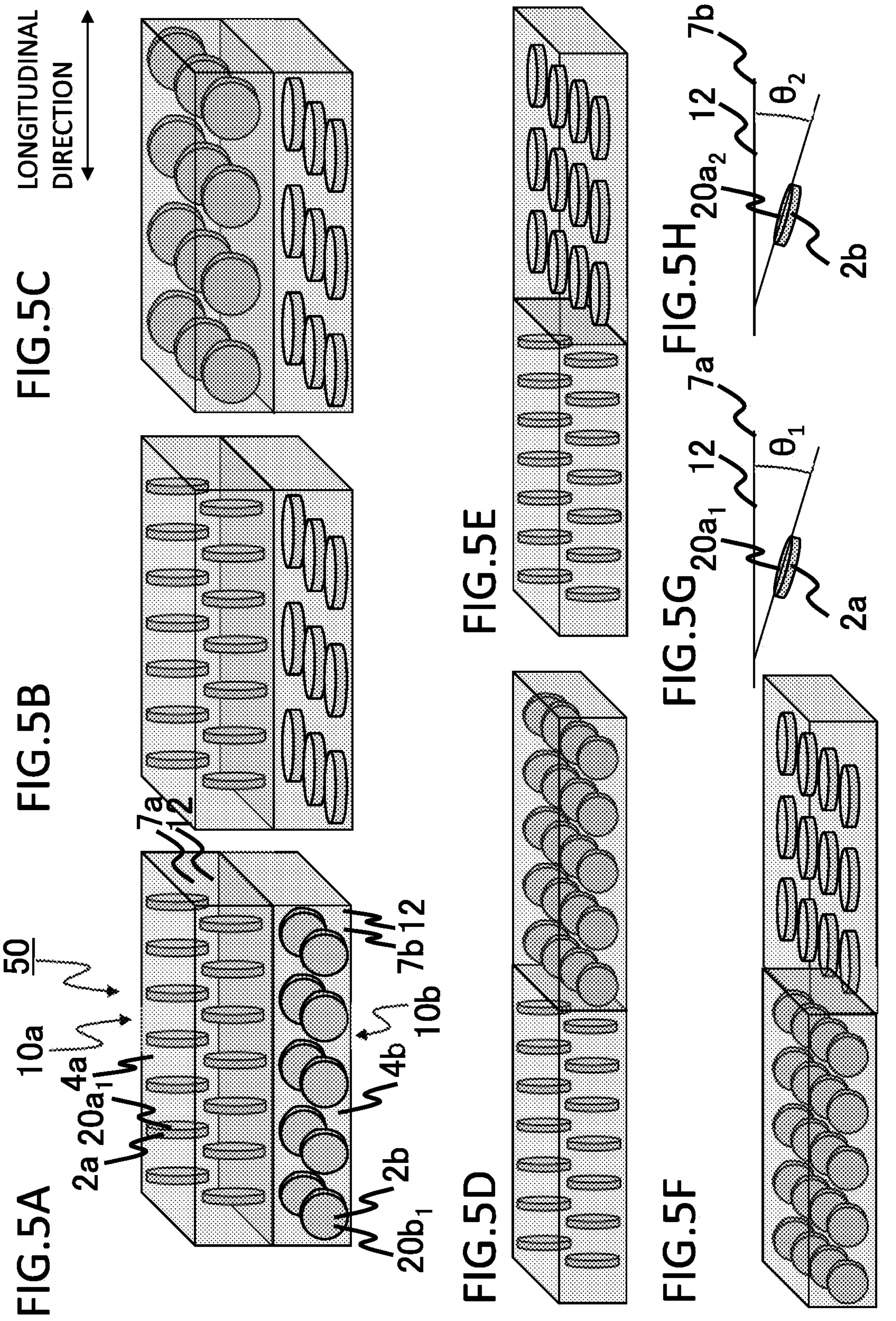
FIGS. 5A to 5H are schematic diagrams illustrating an example of a first magnetic material and a second magnetic material according to the first embodiment.
Figures 6A, 6B, 6C, 6D, 6E:
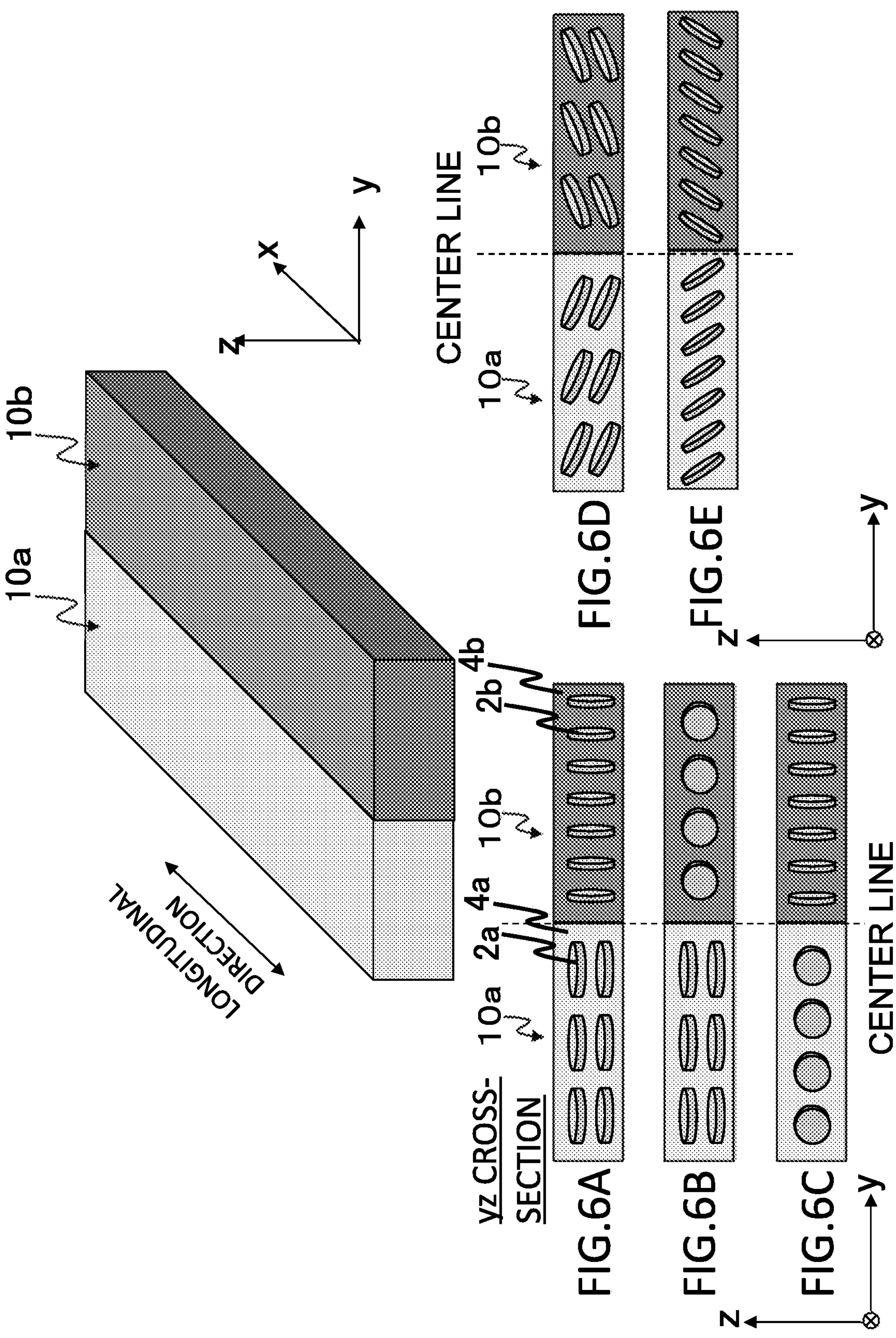
FIGS. 6A to 6E are schematic diagrams illustrating, as another example of a first magnetic material and a second magnetic material according to the first embodiment, a form in which the disposition of the first magnetic body part and the disposition of the second magnetic body part are different.

FIGS. 5A to 5H are schematic diagrams illustrating examples of the first magnetic material 10*a* and the second magnetic material 10*b* according to the first embodiment. FIGS. 6A to 6E are schematic diagrams illustrating, as other examples of the first magnetic material 10*a* and the second magnetic material 10*b* according to the first embodiment, a form in which the disposition of the first magnetic body part 2*a* and the disposition of the second magnetic body part 2*b* are different. For both of them, it is more preferable that the first principal surface part $\mathbf{20}a_1$ of the first magnetic body part 2*a* of the first magnetic material 10*a* and the second principal surface part $\mathbf{20}a_2$ of the second magnetic body part 2*b* of the second magnetic material 10*b* are disposed in directions approximately perpendicular to each other. In FIG. 6D and FIG. 6E, unlike FIG. 6A, FIG. 6B, and FIG. 6C, the first principal surface part $\mathbf{20}a_1$ of the first magnetic body part 2*a* and the second principal surface part $\mathbf{20}a_2$ of the second magnetic body part 2*b* are not in directions approximately perpendicular to each other, but are approximately parallel to each other, and thus the two are disposed symmetrically about the interface between the two parts (that is, disposed symmetrically about the center line in the width direction). However, in this case, it is preferable from the viewpoint of magnetic characteristics. That is, it is preferable in a case in which the magnetic composite material 50 is incorporated into a stator or a rotor of a rotating electric machine and is used as magnetic wedges as shown in FIG. 16 to FIG. 18 that will be described below. In this case, since the magnetic flux can efficiently flow from the stator to the rotor while the magnetic flux still passes through the magnetic composite material 50, high torque and high efficiency (due to reduction of the harmonic loss) can be realized, which is preferable. That is, while the magnetic flux is efficiently guided from the stator toward the rotor side by reducing any leaking magnetic flux between the teeth in a motor (realizing high torque), the magnetic flux is caused to flow toward the magnetic composite material 50 side to a certain extent, and therefore, the harmonic loss is reduced (realizing an increase in the motor efficiency), which is preferable. Although a symmetrical disposition is not necessarily achieved, similar effects can be obtained by adopting an inclined disposition. Meanwhile, FIG. 5G illustrates an example of first angle $\theta_1$. The angle formed by the surface 12 (first plane 7*a*) and a line parallel to the principal surface 20 (first principal surface part 20*a*$_1$) of a magnetic body 2 (first magnetic body part 2*a*) is the first angle $\theta_1$. FIG. 5H illustrates an example of second angle $\theta_2$. The angle formed by the surface 12 (second plane 7*b*) and a line parallel to the principal surface 20 (second principal surface part 20*a*$_2$) of the magnetic body 2 (second magnetic body part 2*b*) is the second angle $\theta_2$. It is preferable that the magnetic bodies are oriented in a direction approximately parallel to 0 degrees or the first angle with respect to the first plane, or the magnetic bodies are oriented in a direction approximately parallel to 0 degrees or the second angle with respect to the second plane. Furthermore, the angle ranges of the first angle and the second angle are preferably in the range of 40° or less, more preferably in the range of 20° or less, and even more preferably in the range of 10° or less. Thereby, the strength of the magnetic composite material 50 is increased, and therefore, it is preferable. FIGS. 5A to 5F and FIGS. 6A to 6C all show the occasion in which the first angle and the second angle are 0°, as an example.

Furthermore, it is preferable that the first plane 7*a* and the second plane 7*b* are disposed approximately perpendicular to each other. Thereby, the strength of the magnetic composite material 50 is increased, and thus it is preferable.

In regard to the first magnetic material 10*a*, it is preferable that the first principal surface part 20*a*$_1$ is oriented in a direction approximately parallel to the angle of 0 degrees with respect to the first plane. Furthermore, it can be said that the same also applies to the second magnetic material 10*b*. More preferably, in regard to the first magnetic material 10*a*, it is preferable that the first principal surface part 20*a*$_1$ is oriented in a direction approximately parallel to the angle of 0 degrees with respect to the first plane, and in regard to the second magnetic material 10*b*, the second principal surface part 20*a*$_2$ is oriented in a direction approximately parallel to an angle of 0 degrees with respect to the second plane.

That is, it is preferable that the magnetic composite material 50 according to the first embodiment is magnetic composite material 50*a* including a magnetic material having a plane on the surface, the magnetic material having a plurality of magnetic bodies 2 having a planar structure, each of the magnetic bodies having a magnetic metal phase 3 containing at least one first element selected from the group consisting of iron (Fe), cobalt (Co), and nickel (Ni), and principal surfaces; and an intercalated phase 4 containing at least one second element selected from the group consisting of oxygen (O), carbon (C), nitrogen (N), and fluorine (F), in which the magnetic bodies 2 have a plurality of first magnetic body parts 2*a* having a planar structure with a first principal surface part 20*a*$_1$; and a plurality of second magnetic body parts 2*b* having a planar structure with a second principal surface part 20*a*$_2$, the intercalated phase 4 includes a first intercalated phase part 4*a* containing at least one of the second elements; and a second intercalated phase part 4*b* containing at least one of the second elements, the magnetic composite material 50 has a first magnetic material 10*a* having a plurality of the first magnetic body parts 2*a* and the first intercalated phase part 4*a*, the first magnetic material 10*a* having a first plane at a surface 12; and a second magnetic material 10*b* having a plurality of the second magnetic body parts 2*b* and the second intercalated phase part 4*b*, the second magnetic material 10*b* having a second plane at a surface 12, the first principal surface parts 20*a*$_1$ in the first magnetic material 10*a* are oriented in a direction approximately parallel to 0 degrees or a first angle with respect to the first plane, each first principal surface part 20*a*$_1$ having the difference in coercivity on the basis of direction within the first plane, and the second principal surface parts 20*a*$_2$ in the second magnetic material 10*b* are oriented in a direction approximately parallel to 0 degrees or a second angle with respect to the second plane, each second principal surface part 20*a*$_2$ having the difference in coercivity on the basis of direction within the second plane.

Figure 7:
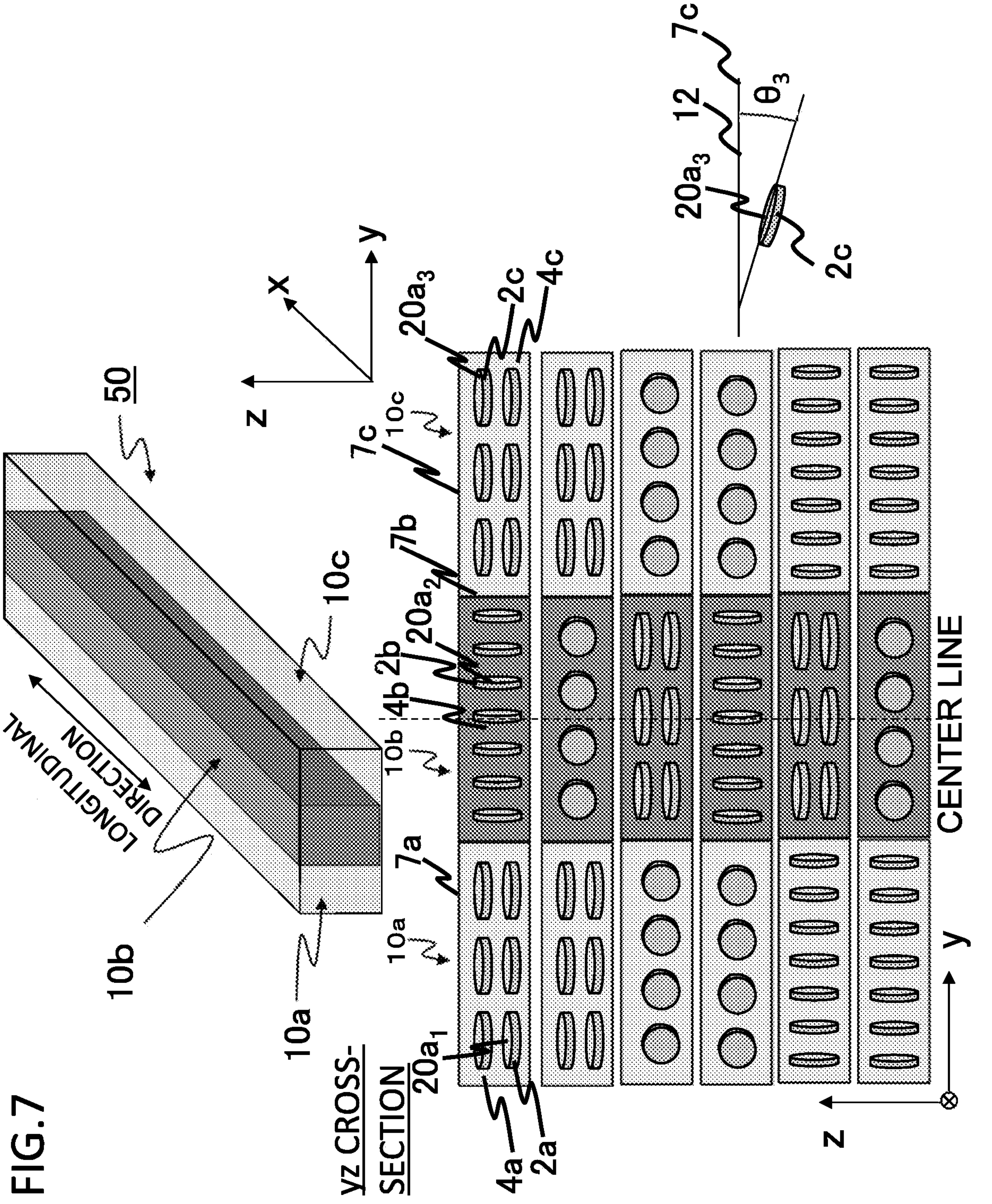
FIG. 7 is a schematic diagram illustrating an example of a first magnetic material, a second magnetic material, and a third magnetic material according to the first embodiment.
Figure 8:
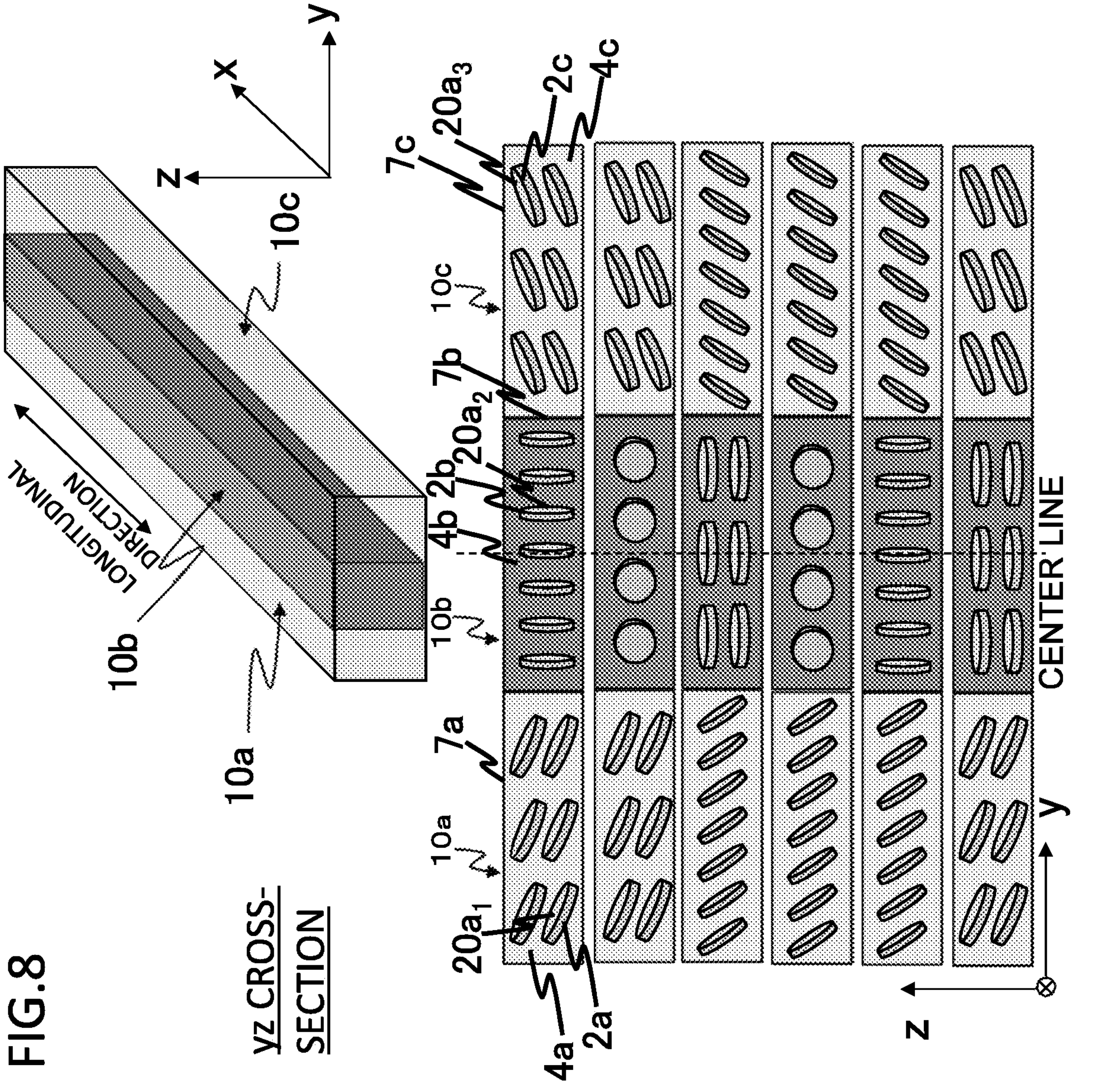
FIG. 8 is a schematic diagram illustrating, as another example of a first magnetic material, a second magnetic material, and a third magnetic material according to the first embodiment, a form in which the disposition of the first magnetic body part and the disposition of the second magnetic body part are different.

FIG. 7 is a schematic diagram illustrating examples of the first magnetic material 10*a*, a second magnetic material 10*b*, and a third magnetic material 10*c* according to the first embodiment. FIG. 8 is a schematic diagram illustrating, as other examples of a first magnetic material 10*a*, a second magnetic material 10*b*, and a third magnetic material 10*c* according to the first embodiment, a form in which the disposition of the first magnetic body parts 2*a* and the disposition of the third magnetic body parts 2*c* are different.

In regard to the magnetic composite materials 50 described in FIG. 7 and FIG. 8, the magnetic bodies 2 further have a plurality of third magnetic body parts 2*c* having a planar structure with a third principal surface part 20*a*$_3$; the intercalated phase 4 further has a third intercalated phase part 4*c* containing at least one of the second elements described above; the magnetic composite material 50 further includes a third magnetic material 10*c* having the third magnetic body parts 2*c* and the third intercalated phase part 4*c*, the third magnetic material 10*c* having a third plane 7*c* at the surface 12; and the third principal surface parts 20*a*$_3$ in the third magnetic material 10*c* are oriented in a direction approximately parallel to 0 degrees or a third angle with respect to the third plane 7*c*, each third principal surface part 20*a*$_3$ having the difference in coercivity on the basis of direction within the third plane 7*c*. In regard to the magnetic composite material of FIG. 7, as an example, a case in which the third angle is 0 degrees is shown. The lower right diagram of FIG. 7 shows an example of the third angle $\theta_3$. The angle formed by the surface 12 (third plane 7*c*) and a line parallel to the principal surface 20 (third principal surface part 20*a*$_3$) of a magnetic body 2 (third magnetic body part 2*c*) is the third angle $\theta_3$.

Furthermore, it is preferable that the first principal surface part 20*a*$_1$ in the first magnetic material 10*a* and the third principal surface part 20*a*$_3$ in the third magnetic material 10*c* are both inclined with respect to the second magnetic material 10*b*, as shown in FIG. 8 (it is preferable that the principal surface parts are symmetrically inclined; however, the principal surface parts may not necessarily need to be symmetrically inclined). Furthermore, it is also acceptable that the second magnetic material 10*b* itself is also inclined. This is particularly preferable in a case in which the magnetic composite material 50 is incorporated into a stator or a rotor of a rotating electric machine and used as magnetic wedges as shown in FIG. 16 to FIG. 18 that will be described below. In the case of the disposition such as shown in FIG. 8, since the magnetic flux flows efficiently from the stator to the rotor while passing through the magnetic composite material 50, high torque and high efficiency (due to a reduction in the harmonic loss) can be realized, which is preferable. That is, while the magnetic flux is efficiently guided from the stator toward the rotor side by reducing any leaking magnetic flux between the teeth in a motor (realizing high torque), the magnetic flux is caused to flow toward the magnetic composite material 50 side to a certain extent, and therefore, the harmonic loss is reduced (realizing an increase in the motor efficiency). Thus, it is preferable.

That is, the magnetic composite material 50 according to the first embodiment is preferably a magnetic composite material 50 in which the magnetic bodies 2 further have a plurality of third magnetic body parts 2$c$ having a planar structure with third principal surface parts 20$a_3$, the intercalated phase 4 further has a third intercalated phase part 4$c$ containing at least one of the second elements described above, the magnetic composite material 50 further includes a third magnetic material 10$c$ having the third magnetic body parts 2$c$ and the third intercalated phase part 4$c$, the third magnetic material 10$c$ having a third plane at the surface 12, and the third principal surface parts 20$a_3$ in the third magnetic material 10$c$ are oriented in a direction approximately parallel to 0 degrees or a third angle with respect to the third plane, each third principal surface part 20$a_3$ having the difference in coercivity on the basis of direction within the third plane.

Furthermore, it is preferable for an increase in the strength of the magnetic composite material 50 that the first plane and the second plane are disposed to be approximately perpendicular to each other, and the second plane and the third plane are disposed to be approximately perpendicular to each other.

Furthermore, in regard to the first magnetic material 10$a$, it is preferable that the first principal surface parts 20$a_1$ are oriented in a direction approximately parallel to an angle of 0 degrees with respect to the first plane. Furthermore, it can be said that the same also applies to the second magnetic material 10$b$ and the third magnetic material 10$c$. More preferably, it is preferable, from the viewpoint of increasing the strength of the magnetic composite material 50, that in regard to the first magnetic material 10$a$, the first principal surface parts 20$a_1$ are oriented in a direction approximately parallel to an angle of 0 degrees with respect to the first plane, in regard to the second magnetic material 10$b$, the second principal surface parts 20$a_2$ are oriented in a direction approximately parallel to an angle of 0 degrees with respect to the second plane, and in regard to the third magnetic material 10$c$, the third principal surface parts 20$a_3$ are oriented in a direction approximately parallel to an angle of 0 degrees with respect to the third plane.

Figure 9:
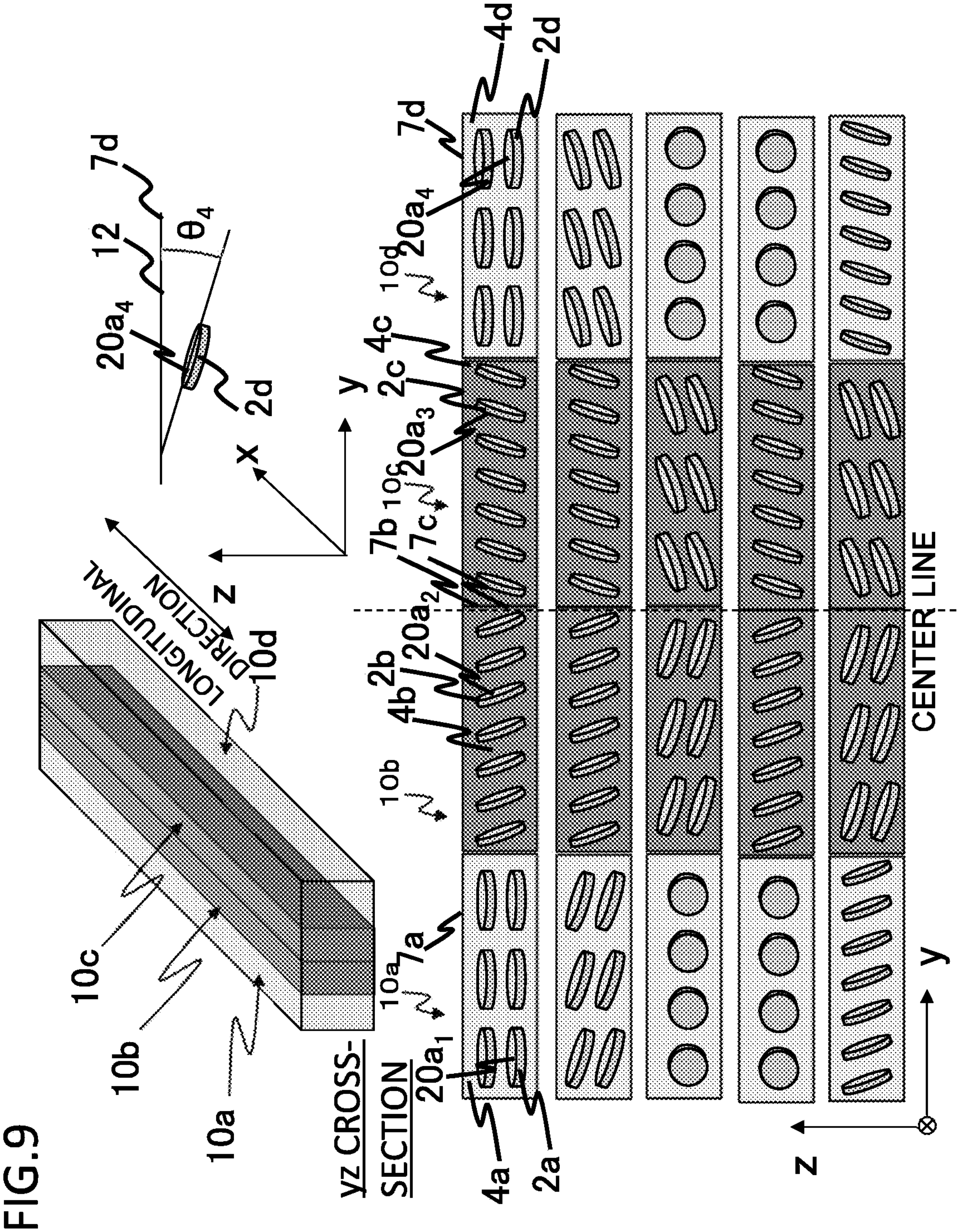
FIG. 9 is a schematic diagram illustrating examples of a first magnetic material, a second magnetic material, a third magnetic material, and a fourth magnetic material according to the first embodiment.

FIG. 9 is a schematic diagram illustrating examples of a first magnetic material 10$a$, a second magnetic material 10$b$, a third magnetic material 10$c$, and a fourth magnetic material 10$d$ according to the first embodiment. The fourth magnetic material 10$d$ has fourth magnetic body parts 2$d$ and a fourth intercalated phase part 4$d$. The fourth magnetic body parts 2$d$ have fourth principal surface parts 20$a_4$. The fourth principal surface parts 20$a_4$ are oriented in a direction approximately parallel to 0 degrees or a fourth angle with respect to a fourth plane 7$d$, and each fourth principal surface part 20$a_4$ has the difference in coercivity on the basis of direction in the fourth plane. The upper right diagram of FIG. 9 shows an example of a fourth angle $\theta_4$. The angle formed by the surface 12 (fourth plane 7$d$) and a line parallel to the principal surface 20 (fourth principal surface part 20$a_4$) of a magnetic body 2 (fourth magnetic body part 2$d$) is the fourth angle $\theta_4$. FIG. 9 shows a case in which the principal surfaces of a plurality of magnetic materials are inclined (may be not necessarily inclined). Furthermore, it is preferable that the principal surfaces are symmetrically inclined with respect to the center line; however, the principal surfaces do not necessarily need to be symmetrically inclined. Furthermore, it is preferable that the fourth plane 7$d$ is disposed to be approximately perpendicular to the second plane 7$b$ or the third plane 7$c$, from the viewpoint of increasing the strength of the magnetic composite material 50. Furthermore, it is preferable that the first plane 7$a$ is disposed to be approximately perpendicular to the second plane 7$b$ or the third plane 7$c$, from the viewpoint of increasing the strength of the magnetic composite material 50. As an example, in the case of a disposition such as shown in FIG. 9, similarly to FIG. 8, since the magnetic flux flows efficiently from the stator to the rotor while passing through the magnetic composite material 50, high torque and high efficiency (due to a reduction in the harmonic loss) can be realized, which is preferable.

In FIG. 7, FIG. 8, and FIG. 9, disposition is achieved symmetrically about the center line in the width direction similarly to FIG. 6D and FIG. 6E, and in this case, it is preferable from the viewpoint of magnetic characteristics. That is, it is preferable in a case in which the magnetic composite material 50 is incorporated into a stator or a rotor of a rotating electric machine and is used as magnetic wedges as shown in FIG. 16 to FIG. 18 that will be described below. In this case, since the magnetic flux flows efficiently from the stator to the rotor while passing through the magnetic composite material 50, high torque and high efficiency (due to a reduction in the harmonic loss) can be realized, which is preferable. That is, while the magnetic flux is guided efficiently from the stator toward the rotor side by reducing any leaking magnetic flux between the teeth in a motor (realizing high torque), the magnetic flux is caused to flow toward the magnetic composite material 50 side to a certain extent, and therefore, the harmonic loss is reduced (realizing an increase in the motor efficiency), which is preferable. Meanwhile, although a symmetric disposition is not necessarily achieved, similar effects can be obtained by adopting an inclined disposition.

Furthermore, when an adhesive layer 11 is provided between adjacent magnetic materials (first magnetic material 10$a$ and second magnetic material 10$b$ in FIGS. 5A to 5H and FIGS. 6A to 6E; first magnetic material 10$a$ and second magnetic material 10$b$, or second magnetic material 10$b$ and third magnetic material 10$c$ in FIG. 7 and FIG. 8; and first magnetic material 10$a$ and second magnetic material 10$b$, second magnetic material 10$b$ and third magnetic material 10$c$, or third magnetic material 10$c$ and fourth magnetic material 10$d$ in FIG. 9; or the like), it is more preferable from the viewpoint of increasing the strength of the magnetic composite material 50. It is preferable that only a pair of adjacent magnetic materials are disposed, with an adhesive layer 11 being disposed therebetween, and it is more preferable that a plurality of pairs of adjacent magnetic materials are disposed, with an adhesive layer 11 being disposed between each pair. When all pairs of adjacent magnetic materials are disposed, with an adhesive layer 11 being disposed between each pair, it is even more preferable. In this case, the adhesive layer 11 is preferably an adhesive layer of the above-mention types. Meanwhile, it is still acceptable without the adhesive layer 11.

Meanwhile, FIG. 5 to FIG. 9 show examples of magnetic bodies 2 and the disposition of magnetic materials for illustrative purposes only, and the magnetic bodies and the disposition of the magnetic materials are not necessarily limited to these (dispositions other than those shown in FIG. 5 to FIG. 9 may also be considered). As long as the basic concept of the present embodiment is adopted, it is not necessary that the disposition is completely the same as those shown in the diagrams.

Furthermore, the first, second, third, and fourth magnetic materials have been described heretofore; however, the number of magnetic materials may be further increased. It is preferable to increase the number of magnetic materials as necessary, such as a fifth magnetic material and a sixth magnetic material, for the purpose of increasing the strength and enhancing the magnetic characteristics.

The magnetic composite material 50 according to the first embodiment is a magnetic composite material 50 including a magnetic material having a plane at a surface 12, the magnetic material including a plurality of magnetic bodies 2 and an intercalated phase 4, each of the magnetic bodies 2 having a planar structure and having a magnetic metal phase 3 containing at least one first element selected from the group consisting of iron (Fe), cobalt (Co), and nickel (Ni), and principal surfaces, the intercalated phase 4 containing at least one second element selected from the group consisting of oxygen (O), carbon (C), nitrogen (N), and fluorine (F); and a plurality of fibrous materials or rod-shaped materials 9 provided in the intercalated phase 4, the fibrous materials or rod-shaped materials being oriented to be approximately perpendicular or approximately parallel to the principal surface, in which in regard to the magnetic composite material 50, the principal surfaces are oriented to be approximately parallel to the plane, and each principal surface has the difference in coercivity on the basis of direction within the plane.

Figure 10:
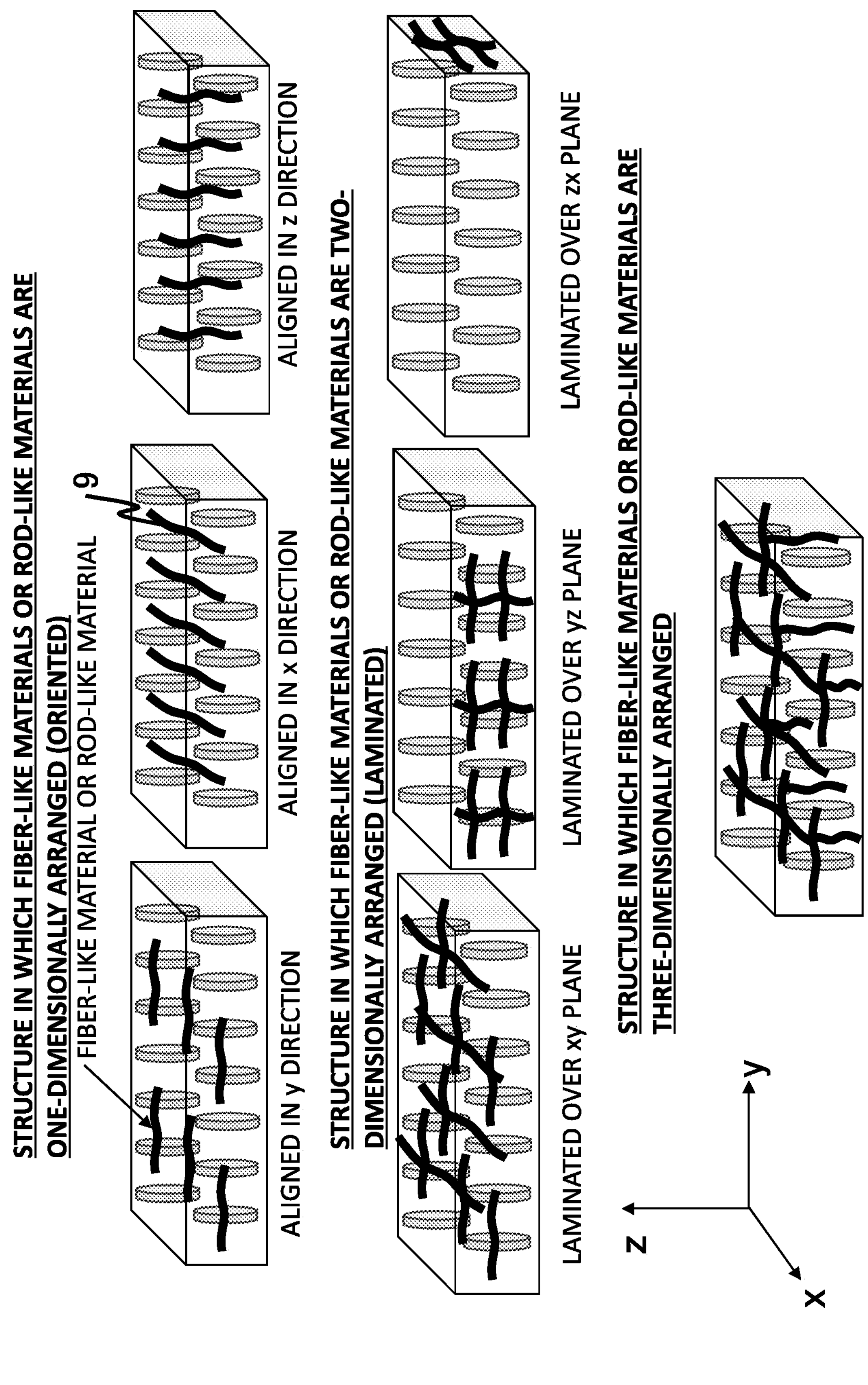
FIG. 10 is a schematic diagram illustrating disposition examples of a fibrous material or a rod-shaped material according to the first embodiment.

FIG. 10 is a schematic diagram illustrating the disposition of fibrous materials or rod-shaped materials 9 according to the first embodiment. As shown in FIG. 10, a structure in which the fibrous materials or rod-shaped materials 9 are disposed one-dimensionally (oriented), a structure in which the fibrous materials or rod-shaped materials 9 are disposed two-dimensionally (laminated), or a structure in which the fibrous materials or rod-shaped materials 9 are disposed three-dimensionally, is preferred.

It is preferable that the magnetic composite material 50 includes fibrous materials (or rod-shaped materials) 9 that are oriented in a direction approximately perpendicular to the oriented principal surfaces. Thereby, the mechanical characteristics (strength and the like) of the magnetic composite material 50 as a whole are enhanced, and it is preferable. The meaning of an approximately perpendicular direction is as described above. FIG. 10 shows a disposition example of the fibrous materials (or rod-shaped materials) 9. Here, it is preferable that the fibrous materials or rod-shaped materials 9 are materials having excellent mechanical characteristics such as flexural strength. The material is not limited; however, examples include natural fibers (plant fibers (cellulose fibers), animal fibers (protein fibers), mineral fibers, and the like), chemical fibers (regenerated cellulose fibers, semi-synthetic fibers (cellulose-based fibers, protein-based fibers, and the like), synthetic fibers (polyamide-based fibers, polyvinyl alcohol-based fibers, polyvinylidene chloride-based fibers, polyvinyl chloride-based fibers, polyester-based fibers, polyacrylonitrile-based fibers, polyethylene-based fibers, polypropylene-based fibers, polyurethane-based fibers, polychlal-based fibers, polyfluoroethylene-based fibers, phenolic fibers, polyether ester-based fibers, polylactic acid-based fibers, and the like), high-performance fibers (aromatic nylon/polyamide-based fibers, fully aromatic polyester-based fibers, ultra high molecular weight polyethylene-based fibers, polyoxymethylene-based fibers, polyimide fibers, and the like), and inorganic fibers (glass fibers, carbon fibers, ceramic fibers, metal fibers, and the like). Furthermore, a material having high electrically insulating properties and high electrical resistance is preferred. This is because the eddy current loss is suppressed. When the fibrous material or rod-shaped material is a material having magnetic properties, it is more preferable because the magnetic characteristics of the magnetic composite material 50 as a whole are enhanced. Furthermore, a material having high heat resistance is preferred. Particularly, polyimide fibers or inorganic fibers are preferable because those fibers can realize high heat resistance. As the amount of the fibrous material or rod-shaped material 9 is larger, strength becomes higher, which is preferable. However, when the amount is too large, in a case in which the fibrous materials or rod-shaped materials 9 are non-magnetic, or even if the materials are magnetic, in a case in which the amount of magnetic components is small, the amount of magnetic components of the magnetic composite material 50 as a whole becomes small. Therefore, magnetic permeability is decreased, or saturation magnetization is decreased, which is not preferable. It is preferable to determine which material should be added in what amount, based on the characteristics required for the system to which the magnetic composite material is applied.

In the following description, flaky magnetic metal particles will be described as an example of magnetic bodies 2 having a planar structure with principal surfaces, and a preferable state of the magnetic bodies 2 will be explained in detail (in addition, in the following description, the magnetic bodies are not limited to flaky magnetic metal particles. It is preferable that the magnetic bodies are flaky magnetic metal particles; however, this is used only an example for illustrative purposes).

A thickness means an average thickness of a single flaky magnetic metal particle. Regarding the method for determining the thickness, the method is not limited as long as it is a method capable of determining the average thickness of one flaky magnetic metal particle. For example, a method of observing a cross-section perpendicular to the flat surface of a flaky magnetic metal particle by transmission electron microscopy (TEM), scanning electron microscopy (SEM), or optical microscopy, selecting any arbitrary ten or more sites in the in-plane direction of the flat surface in a cross-section of the flaky magnetic metal particle thus observed, measuring the thicknesses at the various selected sites, and employing the average value of the thicknesses, may be used. Furthermore, a method of selecting ten or more sites in a cross-section of the observed flaky magnetic metal particle from an end toward the other end at an equal interval in a direction within the flat surface (at this time, since the end and the other end are special places, it is preferable not to select the end parts), measuring the thickness at each of the sites thus selected, and employing the average value of the thicknesses, may also be used. All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve appropriately according to the circumstance, and then the above-described method is carried out.

Furthermore, the average thickness refers to the average value of the thickness of a plurality of flaky magnetic metal particles, and the average thickness is distinguished from the simple "a thickness" described above. When the average thickness is to be determined, it is preferable to employ an average value calculated for twenty or more flaky magnetic metal particles. Furthermore, it is preferable to determine the average thickness for as many flaky magnetic metal particles as possible as the objects of measurement, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is preferably from 10 nm to 100 μm, more preferably from 10 nm to 1 μm, and even more preferably from 10 nm to 100 nm. Furthermore, it is preferable that the flaky magnetic metal particles include particles having a thickness of from 10 nm to 100 μm, more preferably from 10 nm to 1 μm, and even more preferably from 10 nm to 100 nm. As a result, when a magnetic field is applied in a direction parallel to the flat surface, the eddy current loss can be made sufficiently small, which is preferable. Furthermore, a smaller thickness is preferred because the magnetic moment is confined in a direction parallel to the flat surface, and magnetization is likely to proceed by rotation magnetization. In a case in which magnetization proceeds by rotation magnetization, since magnetization is likely to proceed reversibly, coercivity is decreased, and the hysteresis loss can be reduced thereby, which is preferable.

The average length of a flaky magnetic metal particle is defined by the formula: (a+b)/2, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as the maximum length a, and the length of the short side is designated as the minimum length b. The maximum length a and the minimum length b can be determined, similarly to the case of the average thickness, by observing the flaky magnetic metal particles by TEM, SEM, or with an optical microscope or the like. Furthermore, it is also possible to determine the maximum length a and the minimum length b by performing an image analysis of microscopic photographs with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement, because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length as average values as far as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape.

However, depending on the flaky magnetic metal particles, in a case in which the maximum length a and the minimum length b are determined by the method described above, the above-described method may be a determination method that does not regard the essence of the purpose. For example, in a case in which a flaky magnetic metal particle is in a state of being elongatedly curved, essentially, the maximum length a of the flaky magnetic metal particle is the effective length in the elongated direction, and the minimum length b is the length of the width. As such, the method for determining the maximum length a and the minimum length b cannot be decided completely uniformly, and basically, there is no problem with a method of "considering a rectangle having the smallest area among the rectangles circumscribing the flat surface, and designating the length of the long side of the rectangle as the maximum length a and the length of the short side as the minimum length b". However, depending on the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: A=((a+b)/2)/t, using the maximum length a, minimum length b, and thickness t.

The average value of the ratio of the average length in the flat surface of the flaky magnetic metal particles with respect to a thickness in each of the flaky magnetic metal particles is preferably from 5 to 10,000. This is because the magnetic permeability increases according to the ratio. Furthermore, it is because since the ferromagnetic resonance frequency can be increased, the ferromagnetic resonance loss can be reduced.

Regarding the ratio of the average length in the flat surface with respect to a thickness in each of the flaky magnetic metal particles, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation is made for as many flaky magnetic metal particles as possible, and an average value calculated for those particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: (Ta+Tb+Tc)/3, and the average value of the ratio of the average length in the flat surface with respect to the thickness is calculated by the formula: (La/Ta+Lb/Tb+Lc/Tc)/3.

Figure 11:
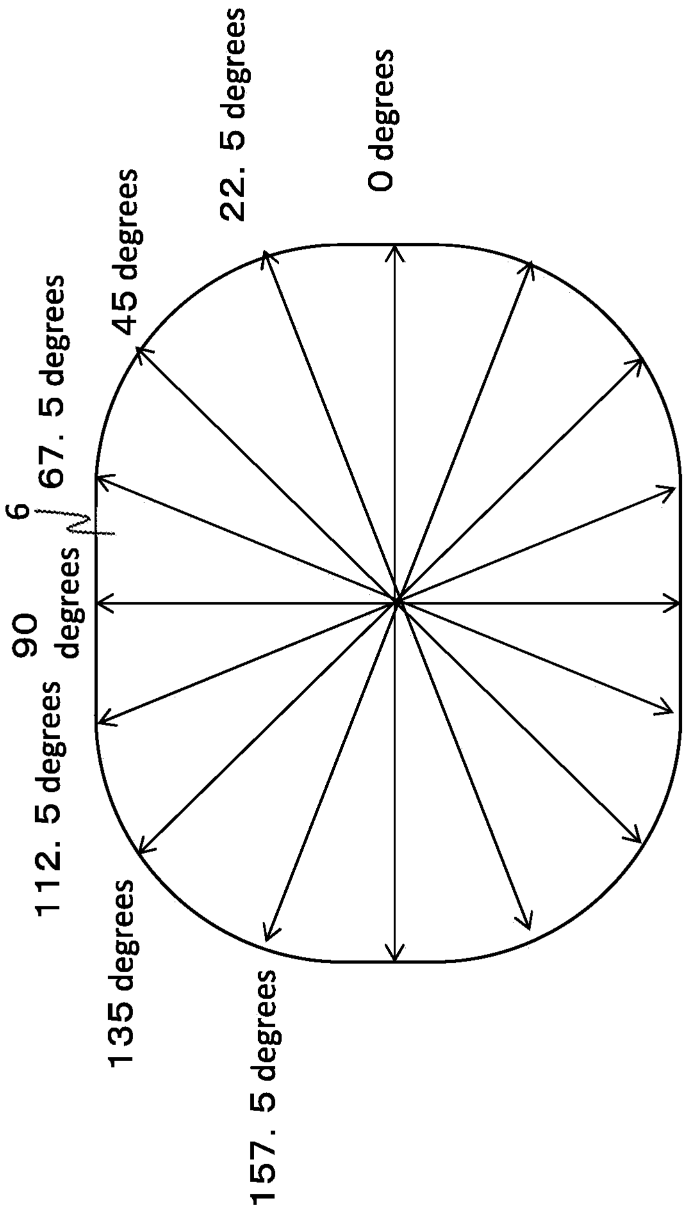
FIG. 11 is a diagram illustrating the directions used when coercivity is measured by varying the direction at an interval of 22.5° over an angle range of 360° in a flat surface of a flaky magnetic metal particle according to the first embodiment.

When the phrase "having the difference in coercivity on the basis of direction" is used, it is implied that when a magnetic field is applied in the direction of 360° in the flat surface and the coercivity is measured, there exist a direction in which maximum coercivity is obtained, and a direction in which minimum coercivity is obtained. For example, when the coercivity is measured by varying the direction at an interval of 22.5° over an angle range of 360° in the flat surface, the difference in coercivity is obtained. In other words, in a case in which there are an angle at which the coercivity becomes larger and an angle at which the coercivity becomes smaller, the concept of "having the difference in coercivity" applies. FIG. 11 is a schematic diagram illustrating the directions used when the coercivity is measured by varying the direction at an interval of 22.5° over an angle range of 360° in the flat surface of a flaky magnetic metal particle according to the first embodiment. By having the difference in coercivity within the flat surface, the minimum coercivity value becomes smaller compared to the case of isotropy with almost no difference in coercivity, which is preferable. In regard to a material having magnetic anisotropy within the flat surface, there is the difference in the coercivity depending on the direction in the flat surface, and the minimum coercivity value becomes small compared to a material that is magnetically isotropic. As a result, the hysteresis loss is reduced, and the magnetic permeability is increased, which is preferable.

Furthermore, the coercivity can be evaluated using a vibrating sample magnetometer (VSM) or the like. In the case of having low coercivity, even a coercivity of 0.1 Oe or less can be measured by using a low magnetic field unit. In regard to the direction of the magnetic field to be measured, measurement is made by varying the direction in the flat surface.

It is more preferable that the proportion of the difference in coercivity on the basis of direction within the flat surface is larger, and it is preferable that the proportion is 1% or more. More preferably, the proportion of the difference in coercivity is 10% or more; even more preferably, the proportion of the difference in coercivity is 50% or more; and still more preferably, the proportion of the difference in coercivity is 100% or more. The proportion of the difference in coercivity as used herein is defined by the formula: $(Hc(max)-Hc(min))/Hc(min)\times 100(\%)$, using the maximum coercivity Hc (max) and the minimum coercivity He (min) in the flat surface.

The ratio a/b of the maximum length a with respect to the minimum length b in the flat surface is preferably 2 or greater on the average, more preferably 3 or greater, even more preferably 5 or greater, and still more preferably 10 or greater. It is preferable that the ratios a/b of the maximum length a with respect to the minimum length b in the flat surface include a ratio value of 2 or greater, more preferably 3 or greater, even more preferably 5 or greater, and still more preferably 10 or greater. Thereby, magnetic anisotropy can be induced easily, which is desirable. When magnetic anisotropy is induced, the difference in coercivity occurs within the flat surface, and the minimum coercivity value becomes smaller compared to magnetically isotropic materials. Thereby, the hysteresis loss is reduced, and the magnetic permeability is enhanced, which is preferable. More preferably, in regard to the flaky magnetic metal particles, it is desirable that either or both of a plurality of concavities and a plurality of convexities described below have their first directions arranged in the maximum length direction. In a case in which the flaky magnetic metal particles are converted into a pressed powder, since the ratio a/b of the flaky magnetic metal particles is large, the area (or area proportion) in which the flat surfaces of individual flaky magnetic metal particles overlap with one another becomes large, and the strength of the pressed powder body increases, which is preferable. Furthermore, when the ratio of the maximum length to the minimum length is larger, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable. On the other hand, from the viewpoint of strength improvement, it is preferable that the ratio a/b of the maximum length a to the minimum length b in the flat surface is, on the average, 1 or higher and lower than 2, and more preferably, 1 or higher and lower than 1.5. Thereby, fluidity or the packing property of the particles is enhanced, which is desirable. Furthermore, the strength in a direction perpendicular to the flat surface is increased compared to the case of having a large value of a/b, and it is preferable from the viewpoint of strength improvement of the flaky magnetic metal particles. Furthermore, when the particles are powder-compacted, there is less chance that the particles are powder-compacted in a bent state, and the stress to the particles is likely to be reduced. That is, strain is reduced, and this leads to reduction of the coercivity and the hysteresis loss. Also, since stress is reduced, thermal stability and mechanical characteristics such as strength and toughness are likely to be enhanced.

Furthermore, a particle having an angle in at least a portion of the contour shape of the flat surface is preferably used. For example, a contour shape such as a square or a rectangle, in other words, a contour shape having an angle of a corner of approximately 90°, is desirable. As a result, symmetry of the atomic arrangement is decreased at the corner parts, the electron orbits are confined, and therefore, magnetic anisotropy can be induced easily to the flat surface, which is desirable.

On the other hand, from the viewpoint of loss reduction or strength improvement, it is desirable that the contour shape of the flat surface is formed by a roundish curve. In an extreme example, it is desirable to employ a round contour shape such as a circle or an ellipse. As a result, abrasion resistance of the particles is enhanced, which is desirable. Furthermore, stress is not likely to be concentrated around the contour shape, the magnetic strain of the flaky magnetic metal particle is reduced, coercivity is decreased, and the hysteresis loss is reduced, which is desirable. Since stress concentration is reduced, thermal stability and mechanical characteristics such as strength and toughness are also likely to be enhanced, which is desirable.

In regard to the flaky magnetic metal particles, the first element includes Fe and Co, and the amount of Co is preferably from 10 at % to 60 at %, and more preferably from 10 at % to 40 at %, with respect to the total amount of FE and Co. Thereby, appropriately high magnetic anisotropy can be easily induced, and the above-described magnetic characteristics are enhanced. Therefore, it is preferable. Furthermore, an Fe—Co system is preferable because high saturation magnetization is likely to be realized. When the composition ranges of Fe and Co fall in the above-described ranges, superior saturation magnetization can be realized, and it is preferable.

It is preferable that the flaky magnetic metal particles contain at least one non-magnetic metal selected from the group consisting of magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gallium (Ga), scandium (Sc), vanadium (V), yttrium (Y), niobium (Nb), lead (Pb), copper (Cu), indium (In), tin (Sn), and rare earth elements. Thereby, thermal stability or oxidation resistance of the flaky magnetic metal particles can be increased. Above all, Al and Si are particularly preferred because Al and Si can easily form a solid solution with Fe, Co, or Ni, which are main components of the flaky magnetic metal particles, and contribute to an enhancement of thermal stability or oxidation resistance.

It is desirable that the flaky magnetic metal particles have a magnetic metal phase 3 containing Fe, Co, and Si. This case will be explained in detail below. In regard to the magnetic metal phase 3, the amount of Co with respect to the total amount of Fe and Co is preferably from 0.001 at % to 80 at %, more preferably from 1 at % to 60 at %, and even more preferably from 5 at % to 40 at %. This is preferable because appropriately high magnetic anisotropy can be induced easily thereby, and the above-described magnetic characteristics are enhanced. Furthermore, it is preferable because an Fe—Co system can readily realize high saturation magnetization. When the composition range of Fe and Co falls in the above-described range, even higher saturation magnetization can be realized, and thus it is preferable. Furthermore, the amount of Si with respect to the total amount of the magnetic metal phase 3 is preferably from 0.001 at % to 30 at %, more preferably from 1 at % to 25 at %, and even more preferably from 5 at % to 20 at %. Thereby, appropriately high magnetocrystalline anisotropy is realized, coercivity is also likely to be reduced, and low hysteresis loss and high magnetic permeability are likely to be realized, which is preferable.

In addition, in a case in which the magnetic metal phase 3 is a system containing Fe, Co, and Si, and the amount of Co and the amount of Si are respectively in the above-described ranges, a particularly significant effect about the induced magnetic anisotropy as described above is exhibited. Compared to a monatomic system of Fe or Co only, or compared to a diatomic system of Fe and Si only or Fe and Co only, in a triatomic system of Fe, Co and Si, particularly appropriately high magnetic anisotropy can be induced easily, coercivity becomes small, and thereby the hysteresis loss is reduced, while the magnetic permeability is increased, which is preferable. This significant effect is brought about particularly only when the composition of the system falls in the composition range described above. Furthermore, in regard to a triatomic system of Fe, Co, and Si, when the composition falls in the composition range described above, the thermal stability and oxidation resistance are also markedly enhanced, and it is preferable. Since the thermal stability and oxidation resistance are enhanced, the mechanical characteristics at high temperature are also enhanced, which is preferable. Furthermore, even for mechanical characteristics at room temperature, mechanical characteristics such as strength, hardness, and abrasion resistance are enhanced, which is preferable. On the occasion of synthesizing the flaky magnetic metal particles, in a case in which flaky magnetic metal particles are obtained by synthesizing a ribbon by a roll quenching method or the like and pulverizing this ribbon, when the magnetic metal phase 3 is a triatomic system of Fe, Co, and Si, and the amount of Co and the amount of Si respectively fall in the ranges described above, the ribbon is likely to be pulverized particularly easily, and thereby, a state in which the flaky magnetic metal particles are not relatively readily subjected to strain can be realized, which is preferable. When the flaky magnetic metal particles are not likely to be subjected to strain, coercivity is likely to be reduced, and low hysteresis loss and high magnetic permeability are likely to be realized, which is preferable. Furthermore, when strain is low, stability over time is increased, or thermal stability is increased, or excellent mechanical characteristics such as strength, hardness, and abrasion resistance are obtained, which is preferable.

The average crystal grain size of the magnetic metal phase 3 is preferably 1 μm or more, more preferably 10 μm or more, even more preferably 50 μm or more, and still more preferably 100 μm or more. Thereby, appropriately high magnetic anisotropy can be induced easily, and the magnetic characteristics described above are enhanced, which is therefore preferable.

It is preferable that the magnetic metal phase 3 includes at least one additive element selected from the group consisting of boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y) Thereby, amorphization proceeds, magnetic anisotropy can be induced easily, and the difference in coercivity within the flat surface becomes large. Therefore, it is preferable. An additive element having a large difference between the atomic radius of the additive element and the atomic radius of at least one first element selected from the group consisting of Fe, Co, and Ni is preferred. Furthermore, an additive element such that the enthalpy of mixing of at least one first element selected from the group consisting of Fe, Co, and Ni with the additive element increases negatively, is preferred. Also, a multicomponent system that is composed of three or more kinds of elements in total, including the first element and an additive element, is preferred. Since semimetallic additive elements such as B and Si have slow rates of crystallization and are easily amorphized, it is advantageous when the semimetallic additive elements are mixed into the system. From the above-described viewpoint, B, Si, P, Ti, Zr, Hf, Nb, Y, Cu, and the like are preferable, and above all, it is more preferable that the additive element includes any one of B, Si, Zr, and Y. It is also preferable that the total amount of the additive element is altogether from 0.001 at % to 80 at % with respect to the total amount of the first element and the additive element. The total amount is more preferably from 5 at % to 80 at %, and even more preferably from 10 at % to 40 at %. As the total amount of the additive element is larger, amorphization proceeds, and it becomes easier to induce magnetic anisotropy, which is preferable (that is, preferable from the viewpoints of low losses and high magnetic permeability). On the other hand, since the proportion of the magnetic metal phase 3 becomes smaller, it is not preferable from the viewpoint that saturation magnetization is reduced. However, depending on the use application (for example, magnetic wedges of a motor), the material can be sufficiently used even in a case in which saturation magnetization is relatively low, and there are occasions in which it is rather preferable that the material specializes in low losses and high magnetic permeability. Meanwhile, magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization (for example, about 0.5 to 1 T), sufficient effects are exhibited. Therefore, it is important to select the composition and the amount of the additive element, depending on the use application.

It is preferable that the flaky magnetic metal particles have a magnetic metal phase 3 including at least one first element selected from the group consisting of Fe, Co, and Ni, and additive elements. In the following description, this case will be explained in detail. It is more preferable that the additive elements include B and Hf. Furthermore, it is preferable that the additive elements are included in a total amount of from 0.002 at % to 80 at %, more preferably from 5 at % to 80 at %, and even more preferably from 10 at % to 40 at %, with respect to the total amount of the magnetic metal phase 3. Thereby, amorphization proceeds, magnetic anisotropy can be induced easily, and the above-described magnetic characteristics are enhanced. Therefore, it is preferable. Furthermore, it is preferable that Hf is included in an amount of from 0.001 at % to 40 at %, more preferably from 1 at % to 30 at %, and even more preferably from 1 at % to 20 at %, with respect to the total amount of the magnetic metal phase 3. Thereby, amorphization proceeds, magnetic anisotropy can be induced easily, and the above-described magnetic characteristics are enhanced. Therefore, it is preferable.

In a case in which the magnetic metal phase 3 is a system formed from the first element described above and the additive elements (B and Hf), and the total amount of the additive element and the amount of Hf are respectively in the above-described ranges, a particularly significant effect about the induced magnetic anisotropy is exhibited. This significant effect is particularly brought about only when the composition of the magnetic metal phase 3 is in the above-mentioned composition range. Furthermore, compared to systems containing other additive elements, particularly in a system including Hf, amorphization proceeds readily with a small amount, magnetic anisotropy can be induced easily, and both of appropriately high magnetic anisotropy and high saturation magnetization is easily realized. Therefore, it is preferable. Furthermore, Hf has a high melting point, and when Hf is included in the magnetic metal phase 3 in the amount range described above, thermal stability and oxidation resistance are markedly enhanced, which is preferable. Furthermore, since thermal stability and oxidation resistance are enhanced, mechanical characteristics at high temperature also enhanced, which is preferable. Also in regard to the mechanical characteristics at room temperature, mechanical characteristics such as strength, hardness, and abrasion resistance are enhanced, and thus it is preferable. Furthermore, when the flaky magnetic metal particles are synthesized, in a case in which flaky magnetic metal particles are obtained by synthesizing a ribbon by a roll quenching method or the like and pulverizing this ribbon, when the magnetic metal phase 3 is a system formed from the first element and the additive elements (B and Hf), and the total amount of the additive elements and the amount of Hf respectively fall in the ranges described above, particularly the ribbon can be pulverized relatively easily, and thereby, a state in which the flaky magnetic metal particles are not relatively readily subjected to strain can be realized. Thus, it is preferable. When the flaky magnetic metal particles are not readily subjected to strain, coercivity is likely to be reduced, and low hysteresis loss and high magnetic permeability are likely to be realized, which is preferable. Furthermore, when strain is reduced, stability over time can be increased, thermal stability can be increased, or excellent mechanical characteristics such as strength, hardness, and abrasion resistance can be obtained. Therefore, it is preferable.

It is preferable that the average crystal grain size of the magnetic metal phase 3 is 100 nm or less, more preferably 50 nm or less, even more preferably 20 nm or less, and still more preferably 10 nm or less. It is more preferable that the average crystal grain size is smaller, and the average crystal grain size is more preferably 5 nm or less, and even more preferably 2 nm or less. Thereby, magnetic anisotropy can be induced easily, and the above-described magnetic characteristics are enhanced, which is therefore preferable. Furthermore, when it is said that the crystal grain size is smaller, it is implied that the phase is closer to an amorphous state. Therefore, the electrical resistance becomes higher compared to highly crystalline materials, and thereby, the eddy current loss can be reduced easily, which is preferable. Furthermore, compared to highly crystalline materials, superior corrosion resistance and oxidation resistance are obtained, and therefore, it is preferable. A crystal grain size of 100 nm or less can be calculated simply by Scherrer's formula based on XRD measurement, and the crystal grain size can also be determined by making an observation of a large number of magnetic metal phases 3 by transmission electron microscopic (TEM) observation and averaging the particle sizes of the magnetic metal phases 3. In a case in which the crystal grain size is small, it is preferable to determine the crystal grain size by XRD measurement, and in a case in which the crystal grain size is large, it is preferable to determine the crystal grain size by TEM observation. However, it is preferable to select the measurement method according to the circumstances, or to use the two methods in combination and determine the crystal grain size in a comprehensive manner.

It is also preferable that the flaky magnetic metal particles have a portion having the crystal structure of the body-centered cubic (bcc) structure. Thereby, appropriately high magnetic anisotropy can be induced easily, and the above-mentioned magnetic characteristics are enhanced. Therefore, it is preferable. Also with a "crystal structure of a mixed phase of bcc and face-centered cubic (fcc)" partially having the crystal structure of the fcc structure, appropriately high magnetic anisotropy can be induced easily, and the above-mentioned magnetic characteristics are enhanced, which is therefore preferable.

It is preferable that the flat surface is crystallographically oriented. The direction of orientation is preferably the (110) plane orientation or the (111) plane orientation, and more preferably the (110) plane orientation. When the crystal structure of the flaky magnetic metal particles is the body-centered cubic (bcc) structure, the (110) plane orientation is preferred, and when the crystal structure of the flaky magnetic metal particles is the face-centered cubic (fcc) structure, the (111) plane orientation is preferred. Thereby, appropriately high magnetic anisotropy can be easily induced, and the magnetic characteristics described above are enhanced. Therefore, it is preferable. Regarding the crystal plane of the flat surface of the flaky magnetic metal particles, the peak intensity ratio of all crystal planes except for the (110) plane is preferably 10% or less, more preferably 5% or less, and even more preferably 3% or less, with respect to the (110) plane. Thereby, appropriately high magnetic anisotropy can be easily induced, and the above-described magnetic characteristics are enhanced. Therefore, it is preferable.

As a more preferable direction of orientation, the (110) [111] direction and the (111) [110] direction are preferred, and the (110) [111] direction is more preferred. When the crystal structure of the flaky magnetic metal particles is the body-centered cubic (bcc) structure, orientation in the (110) [111] direction is preferred, and when the crystal structure of the flaky magnetic metal particles is the face-centered cubic (fcc) structure, orientation in the (111) [110] direction is preferred. Thereby, appropriately high magnetic anisotropy can be easily induced, and the magnetic characteristics described above are enhanced, which is preferable. According to the present specification, the "(110) [111] direction" refers to a direction in which the slide surface is the (110) plane or a plane crystallographically equivalent thereto, namely, the {110} plane, and the slide direction is the [111]

direction or a direction crystallographically equivalent thereto, namely, the <111> direction. The same also applies to the (111) [110] direction. That is, the (111) [110] direction refers to a direction in which the slide surface is the (111) plane or a plane crystallographically equivalent thereto, namely, the {111} plane, and the slide direction is the [110] direction or a direction crystallographically equivalent thereto, namely, the <110> direction.

It is preferable that the flaky magnetic metal particles have high saturation magnetization, and the saturation magnetization is preferably 1 T or greater, more preferably 1.5 T or greater, even more preferably 1.8 T or greater, and still more preferably 2.0 T or greater. Thereby, magnetic saturation is suppressed, and magnetic characteristics can be exhibited sufficiently in the system, which is preferable. However, depending on the use application (for example, magnetic wedges of a motor), the flaky magnetic metal particles can be used sufficiently even in a case in which the saturation magnetization is relatively low, and it may be rather preferable that the flaky magnetic metal particles are specialized for low losses. Meanwhile, the magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization, sufficient effects are exhibited. Therefore, it is important to select the composition depending on the use application.

The lattice strain of the flaky magnetic metal particles is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable.

The lattice strain can be calculated by analyzing in detail the line widths obtainable by X-ray diffraction (XRD) That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is represented by the following expression:

(β: 積分幅, K: 定数、 λ: 波長, D: 結晶粒径, $$\sqrt{\overline{\varepsilon^2}}$$

格子歪み(二乗平均平方根))

$$\frac{\beta^2}{\tan^2\theta} = \frac{K\lambda}{D}\frac{\beta}{\tan\theta\sin\theta} + 16\varepsilon^2, \varepsilon = \varepsilon_{max} = \frac{\sqrt{2\pi}}{2}\sqrt{\overline{\varepsilon^2}}$$

(β: integrated width, K: constant, λ: wavelength, D: crystal grain size, $\varepsilon^2$: lattice strain (root-mean-square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain 8 is calculated from the ordinate intercept. When the lattice strain obtained by a Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, appropriately high magnetic anisotropy can be induced easily, and the magnetic characteristics described above are enhanced, which is therefore preferable.

The lattice strain analysis described above is a technique that is effective in a case in which a plurality of peaks can be detected by XRD; however, in a case in which the peak intensities in XRD are weak, and there are few peaks that can be detected (for example, when only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0\times100(\%)$. Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}$ $(=(d_{max}-d_{min})/d_{min}\times100(\%))$ is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented in the flat surface. Thereby, appropriately high magnetic anisotropy can be induced easily, and the magnetic characteristics described above are enhanced, which is therefore preferable.

It is preferable that the flat surface of a flaky magnetic metal particle has either or both of a plurality of concavities and a plurality of convexities, the concavities and the convexities being arranged in a first direction and each of the concavities and the convexities having a width of 0.1 μm or more, a length of 1 μm, and an aspect ratio of 2 or higher. Thereby, magnetic anisotropy is easily induced in the first direction, and the difference in coercivity on the basis of direction within the flat surface is increased, which is preferable. From this point of view, it is more preferable that the width is 1 μm or more and the length is 10 μm or more. The aspect ratio is preferably 5 or higher, and more preferably 10 or higher. Furthermore, by including such concavities or convexities, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles), and thereby, thermal stability and mechanical characteristics such as strength and hardness are enhanced. Therefore, it is preferable.

One flaky magnetic metal particle may have both concavities and convexities. The aspect ratio of a concavity or a convexity is the ratio of the length of the major axis to the length of the minor axis. That is, when the length side of a concavity or a convexity is larger (longer) than the width, the aspect ratio is defined as the ratio of length to width, and when the width is larger (longer) than the length, the aspect ratio is defined as the ratio of width to length. As the aspect ratio is higher, the flaky magnetic metal particle is more likely to have magnetic uniaxial anisotropy (anisotropy), which is more preferable.

Furthermore, the phrase "(be) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". Thereby, the flaky magnetic metal particles are likely to have magnetic uniaxial anisotropy in the first direction by a shape magnetic anisotropy effect, which is preferable. It is preferable that the flaky magnetic metal particles have a magnetic anisotropy in one direction within the flat surface, and this will be described in detail. First, in a case in which the magnetic domain structure of the flaky magnetic metal particles is a multi-domain structure, the magnetization process proceeds by domain wall displacement; however, in this case, the coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction in the flat surface, magnetic characteristics are enhanced as compared to an isotropic material. Particularly, magnetic characteristics are superior in the easy axis direction in the flat surface than in the hard axis direction, which is preferable. Next, in a case in which the magnetic domain structure of the flaky magnetic metal particles is a single domain structure, the magnetization process proceeds by rotation magnetization; however, in this case, the coercivity in the hard axis direction in the flat surface becomes lower than that in the easy axis direction, and losses become small. In a case in which magnetization proceeds completely by rotation magnetization, the coercivity becomes zero, and the hysteresis loss becomes zero, which is preferable. Whether magnetization proceeds by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the magnetic interaction between particles, and the like. For example, as the thickness t of the flaky magnetic metal particles is smaller, the magnetic domain structure is more likely to become a single domain structure, and when the thickness is from 10 nm to 1 μm, and particularly when the thickness is from 10 nm to 100 nm, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies depending also on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

As described above, it is preferable that the flaky magnetic metal particles have magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 μm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

In regard to the flaky magnetic metal particles, it is preferable that the first directions of either or both of a plurality of concavities and a plurality of convexities are mostly arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions) coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy can be easily induced, which is preferable.

In regard to either or both of a plurality of concavities and a plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is from 0.1 μm to 100 μm. It is also desirable that a plurality of extraneous metal particles containing at least one first element selected from the group consisting of Fe, Co and Ni and having an average size of from 1 nm to 1 μm, are arranged along the concavities or convexities. Regarding the method for determining the average size of the extraneous metal particles, the average size is calculated by averaging the sizes of a plurality of extraneous metal particles arranged along the concavities or convexities, based on observation by TEM, SEM, an optical microscope, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and thereby, mechanical characteristics such as strength and hardness, and thermal stability are enhanced, which is preferable.

It is desirable that each of the flaky magnetic metal particles further comprises a plurality of small magnetic metal particles, that is, five or more particles on the average, on the flat surface. The small magnetic metal particles contain at least one first element selected from the group consisting of Fe, Co, and Ni, and the average particle size is from 10 nm to 1 μm. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase 4 that will be described below, adhesiveness is greatly enhanced. Thereby, thermal stability and mechanical characteristics such as strength and toughness can be easily enhanced. In order to exhibit such effects at the maximum level, it is desirable that the average particle size of the small magnetic metal particles is adjusted to be from 10 nm to 1 μm, and five or more small magnetic metal particles on the average are integrated with the surface, that is, the flat surface, of the flaky magnetic metal particles. When the small magnetic metal particles are unidirectionally arranged within the flat surface, magnetic anisotropy can be easily induced in the flat surface, and high magnetic permeability and low losses can be easily realized. Therefore, it is more preferable. The average particle size of the small magnetic metal particles is determined by observing the particles by TEM, SEM, an optical microscope, or the like.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is from 0.1% to 60%, low coercivity, low hysteresis loss, high magnetic permeability, and high thermal stability can be realized, which is preferable. Furthermore, since the variation is small, it is also easy to realize a high yield. A more preferred range of the CV value is from 0.1% to 40%.

One effective method for providing the difference in coercivity on the basis of direction within the flat surface of a flaky magnetic metal particle is a method of subjecting the flaky magnetic metal particle to a heat treatment in a magnetic field. It is desirable to perform a heat treatment while a magnetic field is applied unidirectionally within the flat surface. Before performing the heat treatment in a magnetic field, it is desirable to find the easy axis direction within the flat surface (find the direction in which coercivity is lowest), and to perform the heat treatment while applying a magnetic field in that direction. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be exhibited in the flat surfaces of the flaky magnetic metal particles, the difference in coercivity on the basis of direction can be provided, and excellent magnetic characteristics can be realized. Therefore, it is preferable. The heat treatment is preferably carried out at a temperature of from 50° C. to 800° C. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can also be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities may be easily arranged in the first direction at the time of ribbon synthesis (concavities or convexities can be easily attached in the direction of rotation of the roll). As a result, the flaky magnetic metal particles can easily have the difference in coercivity on the basis of direction within the flat surface, which is preferable. That is, the direction in which either or both of a plurality of concavities and a plurality of convexities are arranged in the first direction with the flat surface, is likely to become the direction of the easy magnetization axis, and the flat surface can be effectively provided with the difference in coercivity on the basis of direction, which is preferable.

It is preferable for the flaky magnetic metal particles that at least a portion of the surface of the flaky magnetic metal particles is covered with a coating layer that has a thickness of from 0.1 nm to 1 μm and contains at least one second element selected from the group consisting of oxygen (O), carbon (C), nitrogen (N), and fluorine (F).

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one second element selected from the group consisting of oxygen (O), carbon (C), nitrogen (N), and fluorine (N). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of forming the coating layer, oxidation resistance, and thermal stability. As a result, the adhesiveness between the flaky magnetic metal particles and the coating layer can be enhanced, and the thermal stability and oxidation resistance of the pressed powder material that will be described below can be enhanced. The coating layer can not only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that the coating layer 14 has high electrical resistance, and for example, it is preferable that the coating layer 14 has an electrical resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming the coating layer on the surface of the flaky magnetic metal particles and integrating the coating layer with the particles may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable as the thickness of the coating layer is larger. However, if the thickness of the coating layer is too large, the saturation magnetization becomes small, and the magnetic permeability also becomes small, which is not preferable. Furthermore, also from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is from 0.1 nm to 1 μm, and more preferably from 0.1 nm to 100 nm.

In regard to the magnetic composite material 50, a magnetic material (pressed powder material) including flaky magnetic metal particles will be taken as an example and will be described in detail (meanwhile, in the following description, the magnetic bodies are not limited to flaky magnetic metal particles. The flaky magnetic metal particles are used only as an example).

It is preferable that saturation magnetization of the pressed powder material is high, and the saturation magnetization is preferably 0.2 T or higher, more preferably 0.5 T or higher, even more preferably 1.0 T or higher, still more preferably 1.8 T or higher, and even more preferably 2.0 T or higher. Thereby, magnetization saturation is suppressed, and the magnetic characteristics can be sufficiently exhibited on the system, which is preferable. However, depending on the use application (for example, magnetic wedges of a motor), the pressed powder material can be used sufficiently even in a case in which saturation magnetization is relatively low, and it is preferable that the pressed powder material is rather specialized for low losses. Therefore, it is important to select the composition according to the use applications.

As the angle formed by a face parallel to the flat surface of a flaky magnetic metal particle and a plane of the pressed powder material is closer to 0°, it is defined that the flaky magnetic metal particle is oriented. The above-mentioned angle is determined for a large number, that is, ten or more, of flaky magnetic metal particles, and it is desirable that the average value of the angles is preferably from 0° to 45°, more preferably from 0° to 30°, and even more preferably from 0° to 10°. That is, in regard to a pressed powder material, it is preferable that the flat surfaces of the flaky magnetic metal particles are oriented into a layered form such that the flat surfaces are parallel to one another or approximately parallel to one another. Thereby, the eddy current loss of the pressed powder material can be reduced, which is preferable. Furthermore, since the diamagnetic field can be made small, the magnetic permeability of the pressed powder material can be made high, which is preferable. Furthermore, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized.

In a case in which coercivity is measured by varying the direction within the above-mentioned plane of a pressed powder material (within the plane parallel to the flat surface of a flaky magnetic metal particle), coercivity is measured by, for example, varying the direction at an interval of 22.5° over the angle of 360° within the plane.

By having the difference in coercivity on the basis of direction within the above-mentioned plane of a pressed powder material, the minimum coercivity value becomes small compared to an isotropic case where there is almost no difference in coercivity, and thus it is preferable. A material having magnetic anisotropy within the plane has differences in coercivity depending on the direction in the plane, and the minimum coercivity value becomes small compared to a magnetically isotropic material. As a result, the hysteresis loss is reduced, and the magnetic permeability is increased, which is preferable.

In the above-mentioned plane of a pressed powder material (in the plane parallel to the flat surface of a flaky magnetic metal particle), it is more preferable as the proportion of the difference in coercivity on the basis of direction is larger, and the proportion is preferably 1% or greater. More preferably, the proportion of the difference in coercivity is 10% or greater; even more preferably, the proportion of the difference in coercivity is 50% or greater; and still more preferably, the proportion of the difference in coercivity is 100% or greater. The proportion of the difference in coercivity as used herein is defined by the formula: $(Hc(max)-Hc(min))/Hc(min)\times100(\%)$, by using the maximum coercivity, Hc(max), and the minimum coercivity, Hc(min), within a flat surface.

Coercivity can be evaluated conveniently by using a vibrating sample magnetometer (VSM) or the like. When the coercivity is low, even a coercivity of 0.1 Oe or less can be measured using a low magnetic field unit. Measurement is made by varying the direction within the above-mentioned plane of a pressed powder material (in the plane parallel to the flat surface of a flaky magnetic metal particle) with respect to the direction of the magnetic field to be measured.

When coercivity is calculated, a value obtained by dividing the difference between the magnetic fields at two points that intersect with abscissa (magnetic fields H1 and H2 where magnetization is zero) by 2 can be employed (that is, coercivity can be calculated by the formula: $coercivity=|H2-H1|/2$).

From the viewpoint of the induced magnetic anisotropy, it is preferable that the magnetic metal particles are arranged so as to have the maximum length directions aligned. Whether the maximum length directions are aligned is determined by making an observation of the magnetic metal particles included in the pressed powder material by TEM or SEM or with an optical microscope or the like, determining the angle formed by the maximum length direction and an arbitrarily determined reference line, and judging the state according to the degree of variation. Preferably, it is preferable to determine the average degree of variation for twenty or more flaky magnetic metal particles; however, in a case in which an observation of twenty or more flaky magnetic metal particles cannot be made, it is preferable that an observation of as many flaky magnetic metal particles as possible is made, and an average degree of variation is determined for those particles. According to the present specification, it is said that the maximum length directions are aligned when the degree of variation is in the range of ±30° or less. It is more preferable that the degree of variation is in the range of ±20° or less, and it is even more preferable that the degree of variation is in the range of ±10° or less. As a result, magnetic anisotropy can be easily induced to the pressed powder material, which is desirable. More preferably, it is desirable that the first directions of either or both of a plurality of concavities and a plurality of convexities in the flat surface are arranged in the maximum length direction. Significant magnetic anisotropy can be induced thereby, and thus it is desirable.

In regard to the pressed powder material, it is preferable that the "proportion of arrangement" at which an approximate first direction is arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. First, for all of the flaky magnetic metal particles to be evaluated in advance, the direction in which the direction of arrangement of the concavities or convexities carried by various flaky magnetic metal particles accounts for the largest proportion is defined as a first direction. The direction in which the largest number of the first directions of the various flaky magnetic metal particles will be arranged in the pressed powder material as a whole is defined as a second direction. Next, directions obtained by dividing the angle of 360° into angles at an interval of 45° with respect to the second direction are determined. Next, the first directions of the various flaky magnetic metal particles are sorted according to the direction of angle to which the first directions are arranged most closely, and that direction is defined as the "approximate first direction". That is, the first directions are sorted into four classes, that is, the direction of 0°, the direction of 45°, the direction of 90°, and the direction of 135°. The proportion in which the approximate first directions are arranged in the same direction with respect to the second direction is defined as the "proportion of arrangement". When this "proportion of arrangement" is evaluated, four consecutive neighboring flaky magnetic metal particles are selected, and the four particles are evaluated. This is carried out repeatedly for at least three or more times (the more the better; for example, five or more times is desirable, and ten or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is shown on the image of observation may also occur at a probability of about 50% (in this case, too, actually there should be concavities or convexities attached to the flat surface on the rear side; however, these flaky magnetic metal particles have been excluded from the evaluation).

Furthermore, it is preferable that the largest number of the approximate first directions is arranged in the direction of the easy magnetization axis of the pressed powder material. That is, it is preferable that the easy magnetization axis of the pressed powder material is parallel to the second direction. Since the length direction in which the concavities or convexities are arranged is likely to become the easy magnetization axis due to the effect of shape magnetic anisotropy, it is preferable to align the directions by taking this direction as the easy magnetization axis, since magnetic anisotropy is easily induced.

It is preferable that a portion of the intercalated phase 4 is attached along the first direction. In other words, it is preferable that a portion of the intercalated phase 4 is attached along the direction of the concavities or convexities on the flat surfaces of the flaky magnetic metal particles. Thereby, magnetic anisotropy can be easily induced unidirectionally, which is preferable. Such attachment of the intercalated phase 4 is preferable because the adhesiveness between the flaky magnetic metal particles is enhanced, and consequently, mechanical characteristics such as strength and hardness and thermal stability are enhanced. It is also preferable that the intercalated phase 4 includes a particulate phase. As a result, the adhesiveness between the flaky magnetic metal particles is maintained in an adequate state appropriately, strain is reduced (since there is a particulate intercalated phase 4 between the flaky magnetic metal particles, the stress applied to the flaky magnetic metal particles is relieved), and coercivity can be easily reduced (hysteresis loss is reduced, and magnetic permeability is increased), which is preferable.

It is preferable that the intercalated phase 4 is included in an amount of from 0.01 wt % to 80 wt %, more preferably from 0.1 wt % to 60 wt %, and even more preferably from 0.1 wt % to 40 wt %, with respect to the total amount of the pressed powder material. If the proportion of the intercalated phase 4 is too large, the proportion of the flaky magnetic metal particles that have the role of exhibiting magnetic properties becomes small, and thereby, the saturation magnetization or magnetic permeability of the pressed powder material is lowered, which is not preferable. In contrast, if the proportion of the intercalated phase 4 is too small, a bonding strength between the flaky magnetic metal particles and the intercalated phase 4 is weakened, and it is not preferable from the viewpoints of thermal stability and mechanical characteristics such as strength and toughness. The proportion of the intercalated phase 4 that is optimal from the viewpoints of magnetic characteristics such as saturation magnetization and magnetic permeability, thermal stability, and mechanical characteristics, is from 0.01 wt % to 80 wt %, more preferably from 0.1 wt % to 60 wt %, and even more preferably from 0.1 wt % to 40 wt %, with respect to the total amount of the pressed powder material.

Furthermore, it is preferable that the proportion of lattice mismatch between the intercalated phase 4 and the flaky magnetic metal particles is from 0.1% to 50%. Thereby, appropriately high magnetic anisotropy can be easily induced, and the above-mentioned magnetic characteristics are enhanced, which is preferable. In order to set the lattice mismatch to the range described above, the lattice mismatch can be realized by selecting the combination of the composition of the intercalated phase 4 and the composition of the flaky magnetic metal particles 10. For example, Ni of the fcc structure has a lattice constant of 3.52 Å, and MgO of the NaCl type structure has a lattice constant of 4.21 Å. Thus, the lattice mismatch of the two is $(4.21-3.52)/3.52\times 100=20\%$. That is, the lattice mismatch can be set to 20% by employing Ni of the fcc structure as the main composition of the flaky magnetic metal particles and employing MgO for the intercalated phase 4. As such, the lattice mismatch can be set to the range described above by selecting the combination of the main composition of the flaky magnetic metal particles and the main composition of the intercalated phase 4.

The intercalated phase 4 contains at least one second element selected from the group consisting of oxygen (O), carbon (C), nitrogen (N), and fluorine (F). It is because the electrical resistance can be increased thereby. It is preferable that the electrical resistivity of the intercalated phase 4 is higher than the electrical resistivity of the flaky magnetic metal particles. It is because the eddy current loss of the flaky magnetic metal particles can be reduced thereby. Since the intercalated phase 4 exists so as to surround the flaky magnetic metal particles, the oxidation resistance and thermal stability of the flaky magnetic metal particles can be enhanced, which is preferable. Above all, it is more preferable that the intercalated phase contains oxygen from the viewpoint of having high oxidation resistance and high thermal stability. Since the intercalated phase 4 also plays a role of mechanically adhering flaky magnetic metal particles to neighboring flaky magnetic metal particles, it is preferable also from the viewpoint of high strength.

The intercalated phase 4 may satisfy at least one of the following three conditions: "being an eutectic oxide", "containing a resin", and "containing at least one magnetic metal selected from Fe, Co, and Ni". This will be described below.

First, the first "case in which the intercalated phase 4 is an eutectic oxide" will be described. In this case, the intercalated phase 4 contains an eutectic oxide containing at least two tertiary elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin) Particularly, it is preferable that the intercalated phase 4 contains an eutectic system containing at least two elements from among B, Bi, Si, Zn, and Pb. As a result, the adhesiveness between the flaky magnetic metal particles and the intercalated phase 4 becomes strong (bonding strength increases), and thermal stability and mechanical characteristics such as strength and toughness can be easily enhanced.

Furthermore, the eutectic oxide preferably has a softening point of from 200° C. to 600° C., and more preferably from 400° C. to 500° C. Even more preferably, the eutectic oxide is preferably an eutectic oxide containing at least two elements from among B, Bi, Si, Zn and Pb, and having a softening point of from 400° C. to 500° C. Thereby, the bonding strength between the flaky magnetic metal particles and the eutectic oxide becomes strong, and the thermal stability and mechanical characteristics such as strength and toughness can be easily enhanced. When the flaky magnetic metal particles are integrated with the eutectic oxide, the two components are integrated while performing a heat treatment at a temperature near the softening point of the eutectic oxide, and preferably a temperature slightly higher than the softening point. Then, the adhesiveness between the flaky magnetic metal particles and the eutectic oxide increases, and mechanical characteristics can be enhanced. Generally, as the temperature of the heat treatment is higher to a certain extent, the adhesiveness between the flaky magnetic metal particles and the eutectic oxide increases, and the mechanical characteristics are enhanced. However, if the temperature of the heat treatment is too high, the coefficient of thermal expansion may be increased, and consequently, the adhesiveness between the flaky magnetic metal particles and the eutectic oxide may be decreased on the contrary (when the difference between the coefficient of thermal expansion of the flaky magnetic metal particles and the coefficient of thermal expansion of the eutectic oxide becomes large, the adhesiveness may be further decreased). Furthermore, in a case in which the crystallinity of the flaky magnetic metal particles is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be from 200° C. to 600° C., and more preferably from 400° C. to 500° C., and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to set the use temperature of the integrated material to be lower than the softening point.

Furthermore, it is desirable that the eutectic oxide has a glass transition temperature. Furthermore, it is desirable that the eutectic oxide has a coefficient of thermal expansion of from $0.5\times10^{-6}$/° C. to $40\times10^{-6}$/° C. Thereby, the bonding strength between the flaky magnetic metal particles 10 and the eutectic oxide becomes strong, and the thermal stability and the mechanical characteristics such as strength and toughness can be easily enhanced.

Furthermore, it is more preferable that the eutectic oxide includes at least one or more eutectic particles that are in a particulate form (preferably a spherical form) having a particle size of from 10 nm to 10 μm. These eutectic particles contain a material that is the same as the eutectic oxide but is not in a particulate form. In a pressed powder material, pores may also exist in some part, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles is more preferably from 10 nm to 1 μm, and even more preferably from 10 nm to 100 nm. As a result, when stress is appropriately relieved during the heat treatment while the adhesiveness between the flaky magnetic metal particles is maintained, the strain applied to the flaky magnetic metal particles can be reduced, and coercivity can be reduced. Thereby, the hysteresis loss is also reduced, and the magnetic permeability is increased. Meanwhile, the particle size of the eutectic particles can be measured by making an observation by TEM or SEM.

Furthermore, it is preferable that the intercalated phase 4 has a softening point that is higher than the softening point of the eutectic oxide, and it is more preferable that the intercalated phase 4 has a softening point higher than 600° C. and further contains intermediate intercalated particles containing at least one element selected from the group consisting of oxygen (O), carbon (C), nitrogen (N), and fluorine (F). When the intermediate intercalated particles exist between the flaky magnetic metal particles, on the occasion in which the pressed powder material is exposed to high temperature, the flaky magnetic metal particles can be prevented from being thermally fused with one another and undergoing deterioration of characteristics. That is, it is desirable that the intermediate intercalated particles exist mainly for the purpose of providing thermal stability. Furthermore, when the softening point of the intermediate intercalated particles is higher than the softening point of the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($ZrO_2$); and composite oxides such as Al—Si—O are preferred from the viewpoint of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($ZrO_2$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the intercalated phase 4 contains a resin" will be described. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamide-imide resin, or copolymers of those resins are used. Particularly, in order to realize high thermal stability, it is preferable that the intercalated phase 4 includes a silicone resin or a polyimide resin, both of which have high heat resistance. As a result, the bonding strength between the flaky magnetic metal particles and the intercalated phase 4 becomes strong, and thermal stability and mechanical characteristics such as strength and toughness can be easily enhanced.

Regarding the resin, it is preferable that the weight reduction percentage after heating for 3,000 hours at 180° C. in an air atmosphere is 5% or less, more preferably 3% or less, even more preferably 1% or less, and still more preferably 0.1% or less. Furthermore, the weight reduction percentage after heating for 200 hours at 220° C. in an air atmosphere is preferably 5% or less, more preferably 3% or less, even more preferably 1% or less, and still more preferably 0.1% or less. Furthermore, the weight reduction percentage after heating for 200 hours at 250° C. in an air atmosphere is preferably 5% or less, more preferably 3% or less, even more preferably 1% or less, and still more preferably 0.1% or less. An evaluation of these weight reduction percentages is carried out using a material in an unused state. An unused state refers to a state that can be used after molding, and is a state that has not been exposed to heat (for example, heat at a temperature of 40° C. or higher), chemicals, sunlight (ultraviolet radiation), or the like from the unused state. The weight reduction percentage is calculated by the following formula from the masses obtained before and after heating: weight reduction percentage (%)=[Mass (g) before heating−mass (g) after heating]/mass (g) before heating×100. It is also preferable that the strength after heating for 20,000 hours at 180° C. in an air atmosphere is a half or more of the strength before heating. It is more preferable that the strength after heating for 20,000 hours at 220° C. in an air atmosphere is a half or more of the strength before heating. Furthermore, it is preferable that the resin satisfies the area division H defined by the Japanese Industrial Standards (JIS). Particularly, it is preferable that the resin satisfies the heat resistance condition of enduring a maximum temperature of 180° C. More preferably, it is preferable that the resin satisfies the area division H defined by the Japanese National Railways Standards (JRE). Particularly, it is preferable that the resin satisfies the heat resistance condition of enduring a temperature increase of 180° C. with respect to the ambient temperature (standard: 25° C., maximum: 40° C.). Examples of a resin preferable for these conditions include a polysulfone, a polyether sulfone, polyphenylene sulfide, polyether ether ketone, an aromatic polyimide, an aromatic polyamide, an aromatic polyamideimide, polybenzoxazole, a fluororesin, a silicone resin, and a liquid crystal polymer. These resins have high intermolecular cohesive power, and therefore, the resins have high heat resistance, which is preferable. Among them, an aromatic polyimide and polybenzoxazole have higher heat resistance and are preferable, because the proportions occupied by rigid units in the molecule are high. Furthermore, it is preferable that the resin is a thermoplastic resin. The specifications about the weight reduction percentage upon heating, the specifications about strength, and the specifications about resin type as described above are respectively effective for increasing the heat resistance of the resin. Due to these, when a pressed powder material comprising a plurality of flaky magnetic metal particles and an intercalated phase 4 (herein, a resin) is formed, the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase 4 exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, in regard to the pressed powder material, it is preferable that the weight reduction percentage after heating for 3,000 hours at 180° C. is 5% or less, more preferably 3% or less, even more preferably 1% or less, and still more preferably 0.1% or less. Furthermore, the pressed powder material is such that the weight reduction percentage after heating for 3,000 hours at 220° C. is preferably 5% or less, more preferably 3% or less, even more preferably 1% or less, and still more preferably 0.1% or less. Furthermore, the weight reduction percentage of the pressed powder material after heating for 200 hours at 250° C. in an air atmosphere is preferably 5% or less, more preferably 3% or less, even more preferably 1% or less, and still more preferably 0.1% or less. The evaluation of the weight reduction percentage is similar to the case of the resin as described above. Furthermore, preferably, it is preferable that the strength of the pressed powder material after heating for 20,000 hours at 180° C. in an air atmosphere is a half or more of the strength before heating. It is more preferable that the strength of the pressed powder material after heating for 20,000 hours at 220° C. in an air atmosphere is a half or more of the strength before heating. Furthermore, it is preferable that the pressed powder material satisfies the area division H defined by the Japanese Industrial Standards (JIS). Particularly, it is preferable that the pressed powder material satisfies the heat resistance condition of enduring a maximum temperature of 180° C. More preferably, it is preferable that the pressed powder material satisfies the area division H defined by the Japanese National Railways Standards (JRE). Particularly, it is preferable that the pressed powder material satisfies the heat resistance condition of enduring a temperature increase of 180° C. with respect to the ambient temperature (standard: 25° C., maximum: 40° C.). The specifications about the weight reduction percentage upon heating, the specifications about strength, and the specifications about resin type as described above are respectively effective for increasing the heat resistance of the pressed powder material, and a material having high reliability can be realized. Since the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase 4 exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, it is preferable that the pressed powder material includes a crystalline resin that does not have a glass transition point up to the thermal decomposition temperature. It is also preferable that the pressed powder material includes a resin having a glass transition temperature of 180° C. or higher, and it is more preferable that the pressed powder material includes a resin having a glass transition temperature of 220° C. or higher. It is even more preferable that the pressed powder material includes a resin having a glass transition temperature of 250° C. or higher. Generally, the flaky magnetic metal particles have a larger crystal grain size as the temperature of the heat treatment is higher. Therefore, in a case in which there is a need to make the crystal grain size of the flaky magnetic metal particles small, it is preferable that the glass transition temperature of the resin used is not too high, and specifically, it is preferable that the glass transition temperature is 600° C. or lower. Furthermore, it is preferable that the crystalline resin that does not have a glass transition point up to the thermal decomposition temperature includes a resin having a glass transition temperature of 180° C. or higher, and it is more preferable that the crystalline resin includes a resin having a glass transition temperature of 220° C. or higher. Specifically, it is preferable that the crystalline resin includes a polyimide having a glass transition temperature of 180° C. or higher, it is more preferable that the crystalline resin includes a polyimide having a glass transition temperature of 220° C. or higher, and it is even more preferable that the crystalline resin includes a thermoplastic polyimide. As a result, fusion of the resin to the magnetic metal particles is likely to occur, and the resin can be suitably used particularly for powder-compacting molding. The thermoplastic polyimide is preferably a polyimide having an imide bond in the polymer chain of a thermoplastic aromatic polyimide, a thermoplastic aromatic polyamideimide, a thermoplastic aromatic polyetherimide, a thermoplastic aromatic polyesterimide, a thermoplastic aromatic polyimidesiloxane, or the like. Among them, when the glass transition temperature is 250° C. or higher, superior heat resistance is obtained, and thus it is preferable.

An aromatic polyimide and polybenzoxazole exhibit high heat resistance since an aromatic ring and a heterocyclic ring are directly bonded to each other and adopt a planar structure, and those planar structures are immobilized by π-π stacking. Thereby, the glass transition temperature can be increased, and thermal stability can be enhanced. Furthermore, the glass transition temperature can be easily adjusted to a desired glass transition point by appropriately introducing a curved unit such as an ether bond into the molecular structure, and thus it is preferable. Above all, when the benzene ring structure of a unit derived from an acid anhydride that constitutes the imide polymer is any one of a biphenyl structure, a triphenyl structure, and a tetraphenyl structure, it is preferable from the viewpoint of strength. Since the symmetric structure between imide groups, which affects heat resistance, is not damaged, and the orientation property also extends over a long distance, the material strength is also increased. An aromatic polyimide structure preferable for this is represented by the following Chemical Formula (1). In other words, the polyimide resin of the first embodiment includes a repeating unit represented by the following Chemical Formula (1):

[Chemical Formula 1]

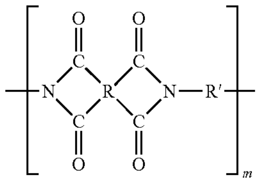

In Chemical Formula (1), R represents any one of a biphenyl structure, a triphenyl structure, and a tetraphenyl structure; and R' represents a structure having at least one or more aromatic rings in the structure.

When the characteristics (weight reduction percentage, resin type, glass transition temperature, molecular structure, and the like) of an intercalated phase 4 (herein, a resin), which is a constituent component of the pressed powder material, are determined from the pressed powder material, only a portion of resin is cut out from the pressed powder material, and evaluation of various characteristics is carried out. In a case in which it cannot be determined by visual inspection whether the portion is formed from a resin or not, the resin and the magnetic metal particles are distinguished by using an elemental analysis based on EDX, or the like.

When the content of the resin contained in the pressed powder material as a whole is larger, the space between the polymer wetting (covering) a flaky magnetic metal particle and the polymer wetting (covering) an adjacent flaky magnetic metal particle can be filled with a polymer without difficulty, and thus mechanical characteristics such as strength are enhanced. Furthermore, the electrical resistivity is also increased, and the eddy current loss of the pressed powder material can be reduced, which is preferable. Meanwhile, as the content of the resin is larger, the proportion of the flaky magnetic metal particles is decreased. Therefore, the saturation magnetization of the pressed powder material decreases, and the magnetic permeability is also decreased, which is not preferable. In order to realize a well-balanced material in comprehensive consideration of mechanical characteristics such as strength, and characteristics such as electrical resistivity, eddy current loss, saturation magnetization, and magnetic permeability, it is preferable to adjust the content of the resin in the entire pressed powder material to 93 wt % or less, more preferably to 86 wt % or less, even more preferably to from 2 wt % to 67 wt %, and still more preferably to from 2 wt % to 43 wt %. Furthermore, the content of the flaky magnetic metal particles is preferably 7 wt % or more, more preferably 14 wt % or more, even more preferably from 33 wt % to 98 wt %, and still more preferably from 57 wt % to 98 wt %. The flaky magnetic metal particles are such that when the particle size decreases, the surface area increases, and the amount of the resin required is dramatically increased. Therefore, it is preferable that the flaky magnetic metal particles have appropriately large particle size. As a result, the pressed powder material can be subjected to high saturation magnetization, the magnetic permeability can be made high, and this is advantageous for miniaturization and power output increase of a system.

Next, the third "case in which the intercalated phase 4 contains at least one magnetic metal selected from Fe, Co, and Ni and has magnetic properties" will be described. In this case, it is preferable because, as the intercalated phase 4 has magnetic properties, the flaky magnetic metal particles can readily interact magnetically with neighboring particles, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the issue of whether the intercalated phase 4 has magnetic properties, an evaluation can be made using a vibrating sample magnetometer (VSM) or the like. In regard to the fact that the intercalated phase 4 contains at least one magnetic metal selected from Fe, Co and Ni and has magnetic properties, an investigation can be performed conveniently by using EDX or the like.

Thus, three conditions of the intercalated phase 4 have been described, and it is preferable that at least one of these three conditions is satisfied; however, it is still acceptable that two or more, or all of the three conditions are satisfied. The "case in which the intercalated phase 4 is an eutectic oxide" (first case) exhibits slightly inferior mechanical characteristics such as strength as compared to a case in which the intercalated phase 4 is a resin (second case); however, on the other hand, the first case is highly excellent from the viewpoint that strain can be easily relieved, and particularly, lowering of coercivity can easily occur, which is preferable (as a result, low hysteresis loss and high magnetic permeability can be easily realized, which is preferable). Furthermore, eutectic oxides have higher heat resistance compared to resins in many cases, and eutectic oxides also have excellent thermal stability, which is preferable. In contrast, the "case in which the intercalated phase 4 contains a resin" (second case) has a defect that since the adhesiveness between the flaky magnetic metal particles and the resin is high, stress is likely to be applied (strain is likely to enter), and as a result, coercivity tends to increase. However, since a resin is highly excellent, particularly in view of mechanical characteristics such as strength, a resin is preferable. The "case in which the intercalated phase 4 contains at least one magnetic metal selected from Fe, Co, and Ni and has magnetic properties" (third case) is preferable because the flaky magnetic metal particles can easily interact magnetically with neighboring particles, and particularly because the intercalated phase 4 becomes highly excellent in view of high magnetic permeability and low coercivity (therefore, low hysteresis loss). An intercalated phase 4 that achieves a good balance can be produced by using the three conditions appropriately, or by combining some of the three conditions, based on the above-described advantages and disadvantages.

In regard to the flaky magnetic metal particles included in the pressed powder material, it is desirable that the particles satisfy the requirements described in the first and second embodiments. Here, description of overlapping matters will not be repeated.

In regard to the pressed powder material, it is preferable that the flat surfaces of the flaky magnetic metal particles described above are oriented in a layered form so as to be parallel to each other. The eddy current loss of the pressed powder material can be reduced thereby, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, as the angle formed by a plane parallel to the flat surface of a flaky magnetic metal particle and a plane of the pressed powder material is closer to 0°, it is defined that the flaky magnetic metal particles are oriented. Specifically, the aforementioned angle is determined for a large number of flaky magnetic metal particles 10, that is, ten or more particles, and it is desirable that the average value is preferably from 0° to 45°, more preferably from 0° to 30°, and even more preferably from 0° to 10°.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are parallel to one another). Furthermore, it is preferable that the magnetic permeability of the intermediate layer is made smaller than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer smaller than the magnetic permeability of the intercalated phase 4 (intercalated phase 4 within the magnetic layer). Thereby, the magnetic permeability in the layer direction can be made even higher in a pseudo thin film laminated structure, and therefore, it is preferable. Also, since the ferromagnetic resonance frequency can be made even higher, the ferromagnetic resonance loss can be made small, which is preferable.

Heretofore, the "specifications for the proportion of the difference in coercivity on the basis of direction within a plane", the "specifications for the size of the magnetic bodies", the "specifications for the composition of the magnetic bodies", the "specifications for concavities and convexities existing on the principal surfaces of the magnetic bodies", the "specifications for the lattice strain of the magnetic bodies", the "specifications for the coating layer included in the magnetic bodies", the "specifications for the intercalated phase", and the like have been described in detail; however, it is preferable that these specifications are satisfied for any one magnetic material among magnetic materials such as first, second, third, and fourth magnetic materials, or a plurality of magnetic materials, or all of the magnetic materials.

Thus, according to the present embodiment, a magnetic composite material 50 having excellent magnetic characteristics and mechanical characteristics can be provided.

Second Embodiment

Figure 12:
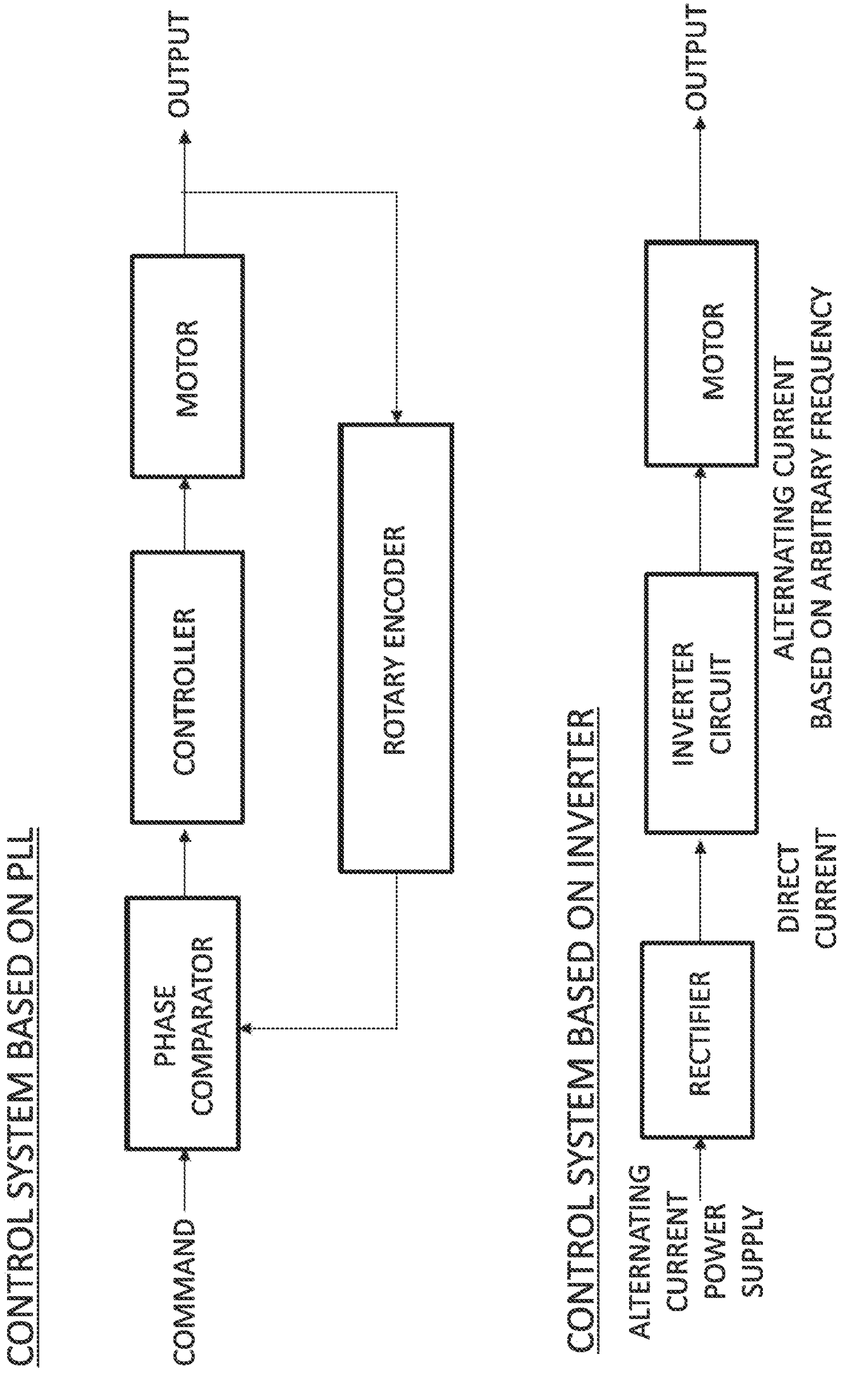
FIG. 12 is an exemplary conceptual diagram of a motor system according to a second embodiment.

The system and the device apparatus of a second embodiment have the magnetic composite material of the first embodiment. Therefore, any matters overlapping with the contents of the first embodiment will not be described repeatedly. Examples of the component parts of the magnetic composite material included in these system and device apparatus include cores for rotating electric machines such as various motors and generators (for example, motors and generators), potential transformers, inductors, transformers, choke coils, and filters; and magnetic wedges for a rotating electric machine. FIG. 12 is an exemplary conceptual diagram of a motor system according to the second embodiment. A motor system is an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 12. A motor system that controls the rotational frequency of a motor based on PLL comprises a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 12. A motor system that controls the electric power of the motor using an inverter comprises an alternating current power supply; a rectifier that converts the output of the alternating current power supply to a direct current; an inverter circuit that converts the direct current to an alternating current based on an arbitrary frequency; and a motor that is controlled by this alternating current.

Figure 13:
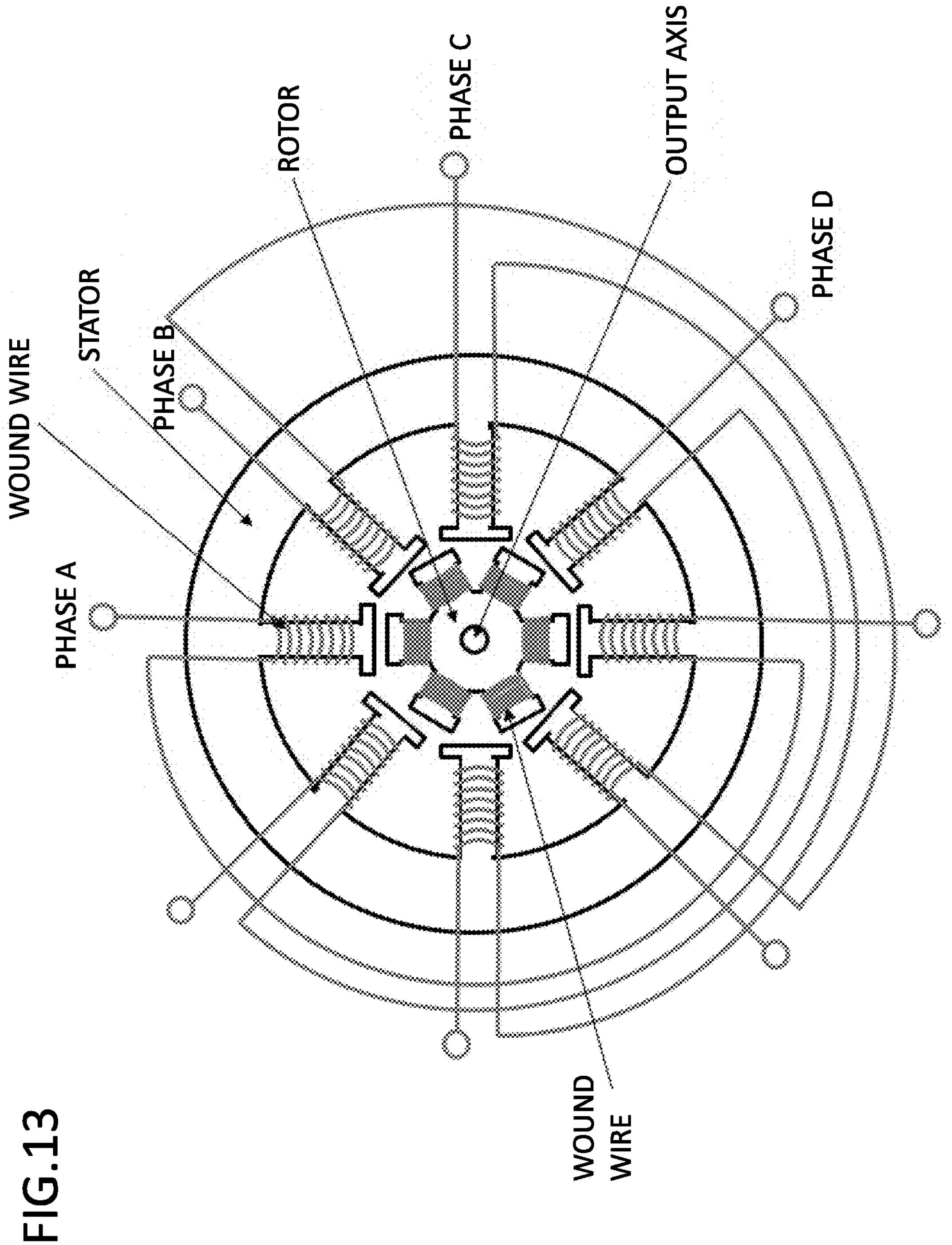
FIG. 13 is a schematic diagram of a motor according to the second embodiment.

FIG. 13 is a schematic diagram illustrating a motor according to the second embodiment. The diagram shown in FIG. 13 is a conceptual diagram of a motor 200 as an example of a rotating electric machine. In the motor 200, a first stator (magneto stator) and a second rotor (rotator) are disposed. FIG. 13 illustrates an inner rotor type motor in which a rotor is disposed on the inner side of a stator; however, an outer rotor type in which the rotor is disposed on the outer side of the stator may also be used.

Figure 14:
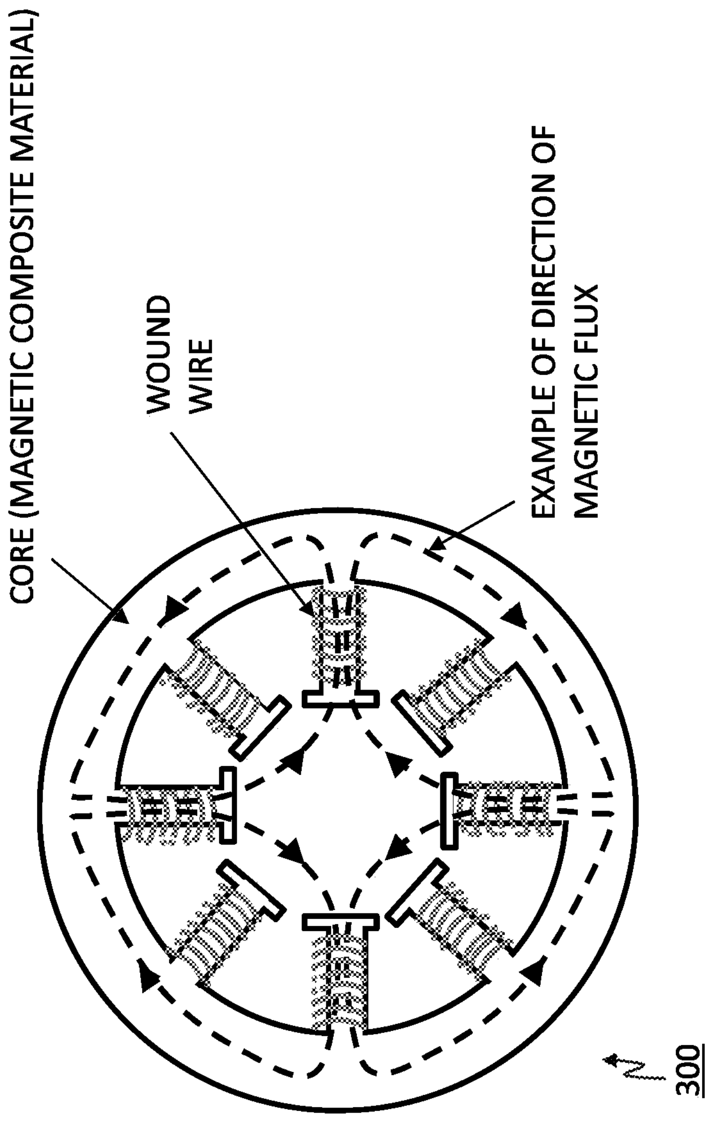
FIG. 14 is a schematic diagram of a motor core (stator) according to the second embodiment.
Figure 15:
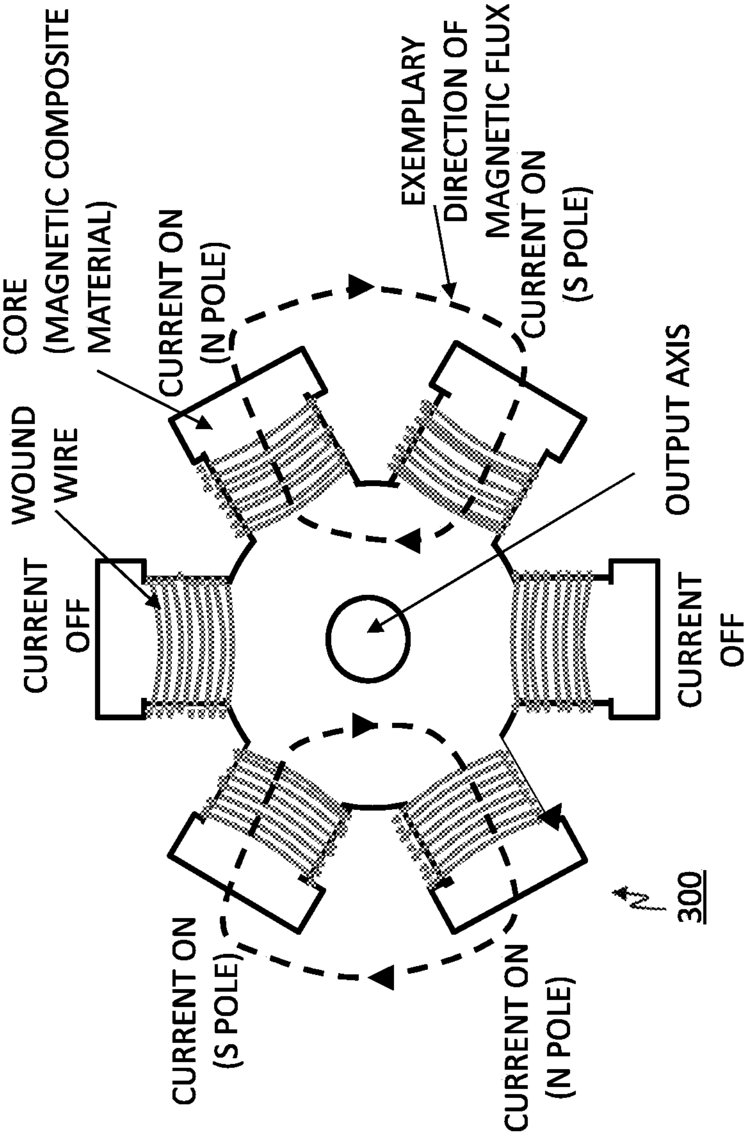
FIG. 15 is a schematic diagram of a motor core (rotor) according to the second embodiment.

FIG. 14 is a schematic diagram of a motor core 300 (stator) according to the second embodiment. FIG. 15 is a schematic diagram of a motor core 300 (rotor) according to the second embodiment. Regarding the motor core, the cores of a stator and a rotor correspond to the motor core. This will be described below. FIG. 14 is an exemplary conceptual cross-sectional diagram of a first stator. The first stator has a core and coils. The coils are wound around some of the protrusions of the core, which are provided on the inner side of the core. In this core, the magnetic composite material of the first embodiment can be disposed. FIG. 15 is an exemplary conceptual cross-sectional diagram of the first rotor. The first rotor has a core and coils. The coils are wound around some of the protrusions of the core, which are provided on the outer side of the core. In this core, the magnetic composite material of the first embodiment can be disposed.

FIG. 14 and FIG. 15 are intended only for illustrative purposes to describe examples of motors, and the applications of the magnetic composite material are not limited to these. The magnetic composite material can be applied to all kinds of motors as cores for making it easy to lead the magnetic flux.

Furthermore, the magnetic composite material can also be used as magnetic wedges of a motor. Usually, coil-wound wires of a rotating electric machine are accommodated in the middle of iron core slots and are supported and fixed by wedges provided at the slot openings. As the material for these wedges, non-magnetic bodies are generally employed; however, since the magnetic resistance value becomes discontinuous at the gap between the stator core and the rotor core, pulsation in the magnetic flux distribution occurs at the iron core surface part facing the wedges, with a gap being disposed between the iron core surface and the wedge, and the harmonic loss becomes large. For the purpose of reducing this harmonic loss, wedges having appropriate magnetic properties (magnetic wedges) have been provided previously. When the magnetic composite material according to the first embodiment is applied to these magnetic wedges, it is preferable because excellent magnetic characteristics and mechanical characteristics are obtained. At this time, it is more preferable that the principal surfaces of the magnetic composite material are disposed to be approximately perpendicular to the gap surface between a stator and a rotor of the rotating electric machine, because the magnetic characteristics can be enhanced. In the following description, flaky magnetic metal particles will be explained as an example of magnetic bodies having a planar structure with principal surfaces.

FIGS. 16A and 16B are schematic diagrams illustrating the direction of disposition of flaky magnetic metal particles in a case in which a magnetic composite material for a magnetic wedge is inserted into a radial gap type rotating electric machine in the second embodiment. FIG. 16A shows a state of disposition of magnetic bodies suitable for reducing a leaking magnetic flux that flows from the gap edge toward the outer side of the iron core. Thereby, an effect of increasing the efficiency of the rotating electric machine by using magnetic wedges can be enjoyed sufficiently. Furthermore, FIG. 16B shows a state of disposition of magnetic bodies suitable for reducing a leaking magnetic flux that flows between the teeth of the iron core via magnetic wedges. Thereby, an effect of increasing the efficiency of the rotating electric machine by using magnetic wedges can be enjoyed sufficiently.

FIG. 17 is a schematic diagram illustrating the direction of disposition of flaky magnetic metal particles in a case in which a magnetic composite material for a magnetic wedge is inserted into an axial gap type rotating electric machine in the second embodiment. FIG. 17 shows a state of disposition of magnetic bodies suitable for reducing a leaking magnetic flux that flows from the gap edge toward the outer side of the iron core, and thereby, an effect of increasing the efficiency of the rotating electric machine by using magnetic wedges can be enjoyed sufficiently. Furthermore, as in the case of FIG. 16B, a state of disposition of magnetic bodies suitable for reducing a leaking magnetic flux that flows between the teeth of the iron core via magnetic wedges can also be attained. Thereby, an effect of increasing the efficiency of the rotating electric machine by using magnetic wedges can be enjoyed sufficiently.

FIG. 18 is a schematic diagram illustrating the direction of disposition of flaky magnetic metal particles in a case in which a magnetic composite material for a magnetic wedge is inserted into a linear motor in the second embodiment. Since a linear motor adopts a planar structure by spreading a radial gap type motor, it is also possible to apply the magnetic wedges of the present embodiment to the linear motor. That is, a stator includes a stator core and field coils interposed at the slots of the stator core, and magnetic wedges may be provided at the slot openings. FIG. 18 shows a state of disposition of magnetic bodies suitable for reducing a leaking magnetic flux that flows from the gap edge toward the outer side of the iron core, and thereby, an effect of increasing the efficiency by using magnetic wedges can be enjoyed sufficiently. Furthermore, similarly to the case of FIG. 16B, a state of disposition of magnetic bodies suitable for reducing a leaking magnetic flux that flows between the teeth of the iron core via magnetic wedges, can be attained. Thereby, an effect of increasing the efficiency caused by using magnetic wedges can be enjoyed sufficiently.

Figure 19:
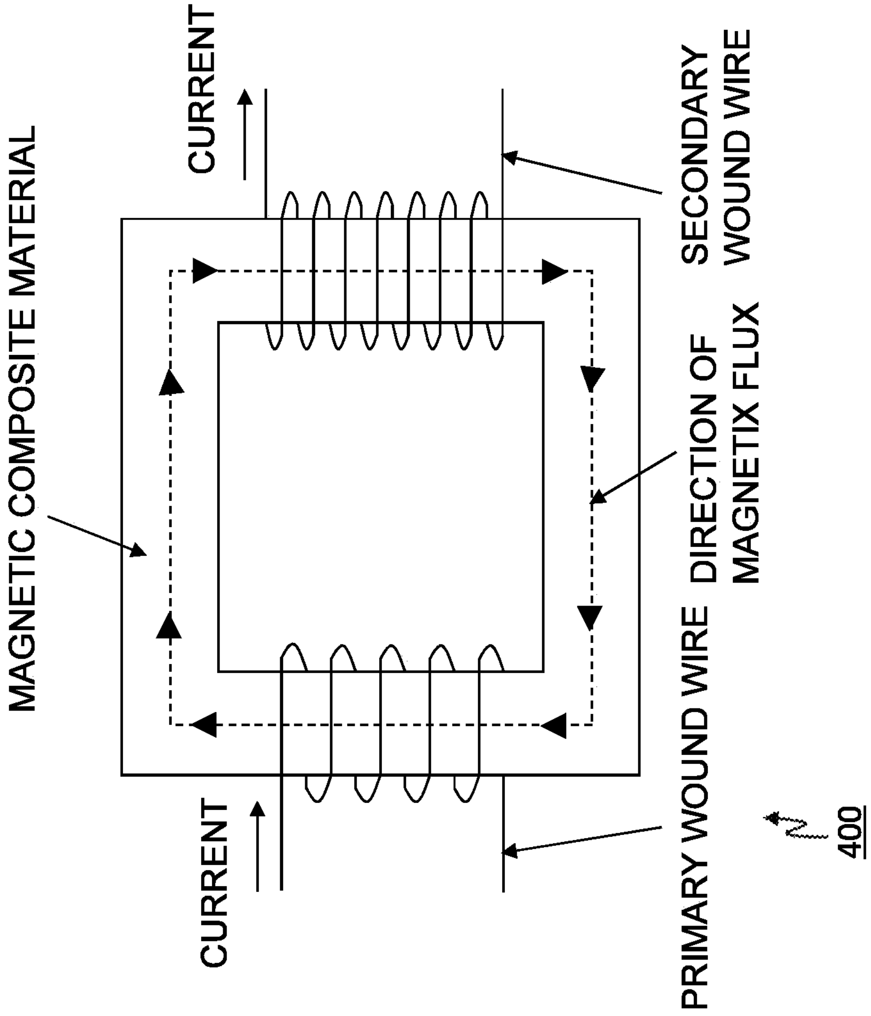
FIG. 19 is a schematic diagram of a potential transformer according to the second embodiment.
Figure 20:
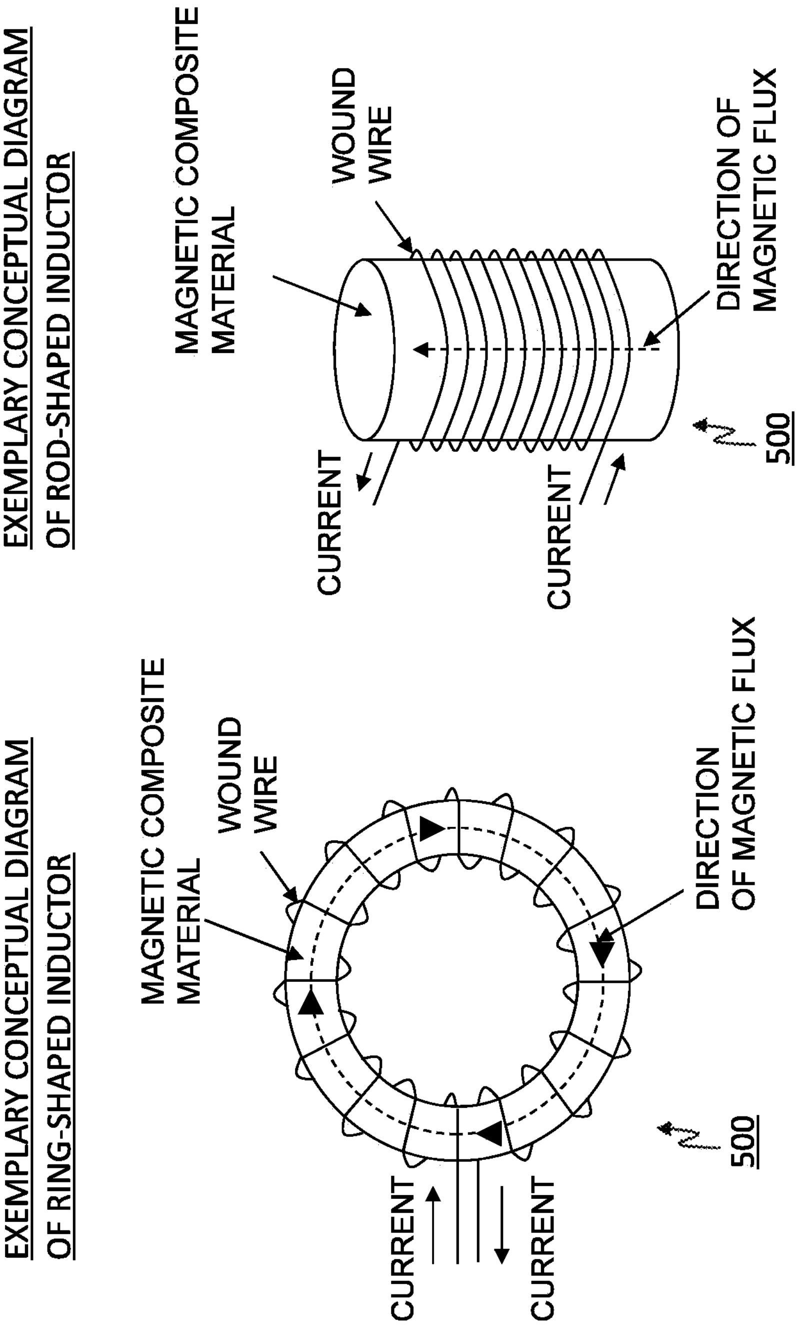
FIG. 20 is an exemplary conceptual diagram of a ring-shaped inductor and an exemplary conceptual diagram of a rod-shaped inductor according to the second embodiment.
Figure 21:
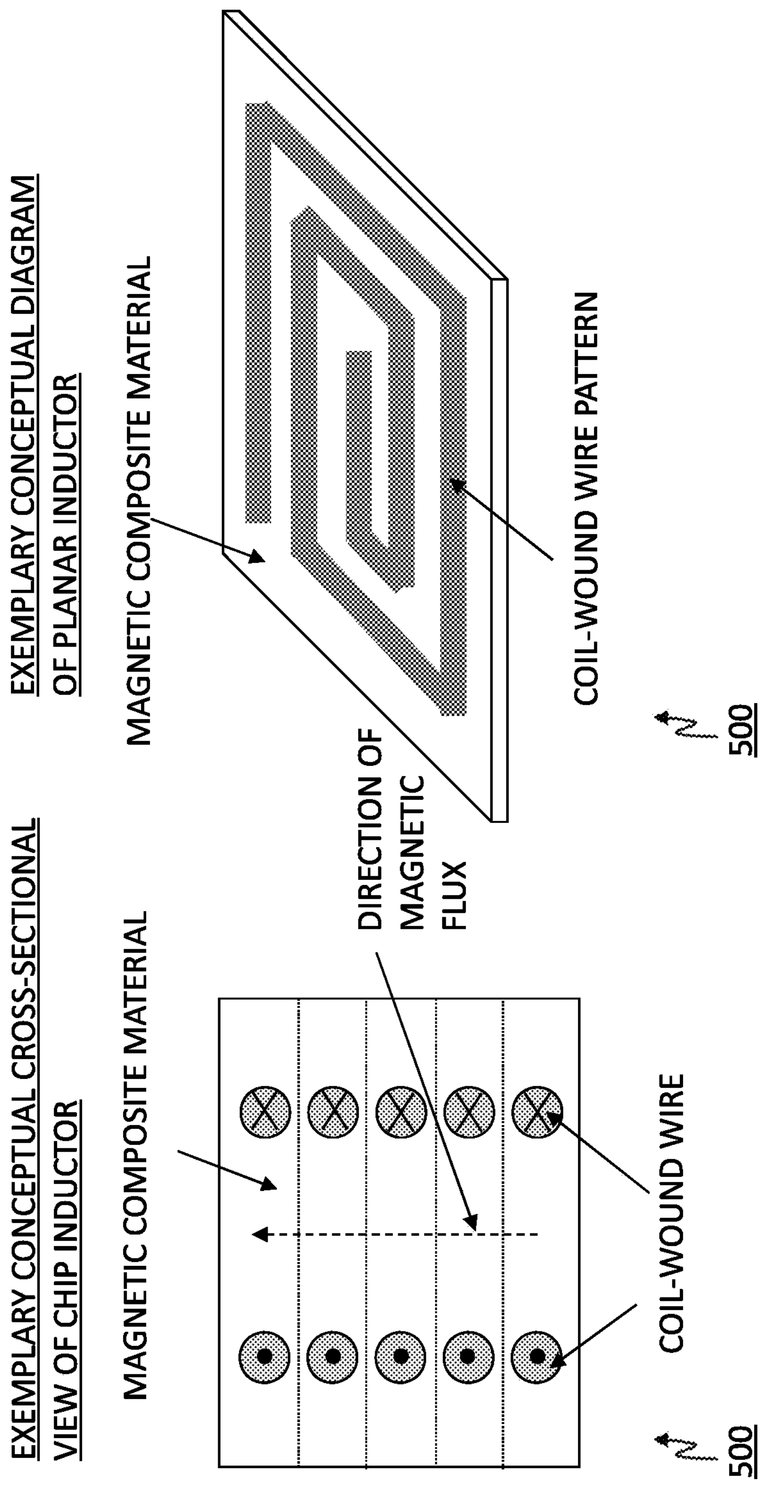
FIG. 21 is an exemplary conceptual diagram of a cross-section of a chip inductor and an exemplary conceptual diagram of a planar inductor according to the second embodiment.

FIG. 19 is a schematic diagram of a potential transformer according to the second embodiment. FIG. 20 shows an exemplary conceptual diagram of a ring-shaped inductor and an exemplary conceptual diagram of a rod-shaped inductor, all according to the second embodiment. FIG. 21 shows an exemplary conceptual diagram of a cross-sectional view of a chip inductor and an exemplary conceptual diagram of a planar inductor, all according to the second embodiment. FIG. 19 shows a potential transformer 400, and FIG. 20 and FIG. 21 respectively show various conceptual diagrams of inductors 500. These diagrams are also intended only for illustrative purposes. Also for the potential transformer 400 and the inductor 500, similarly to the motor core, the magnetic composite materials can be applied to all kinds of potential transformers and inductors in order to make it easy to lead the magnetic flux, or to utilize high magnetic permeability.

Figure 22:
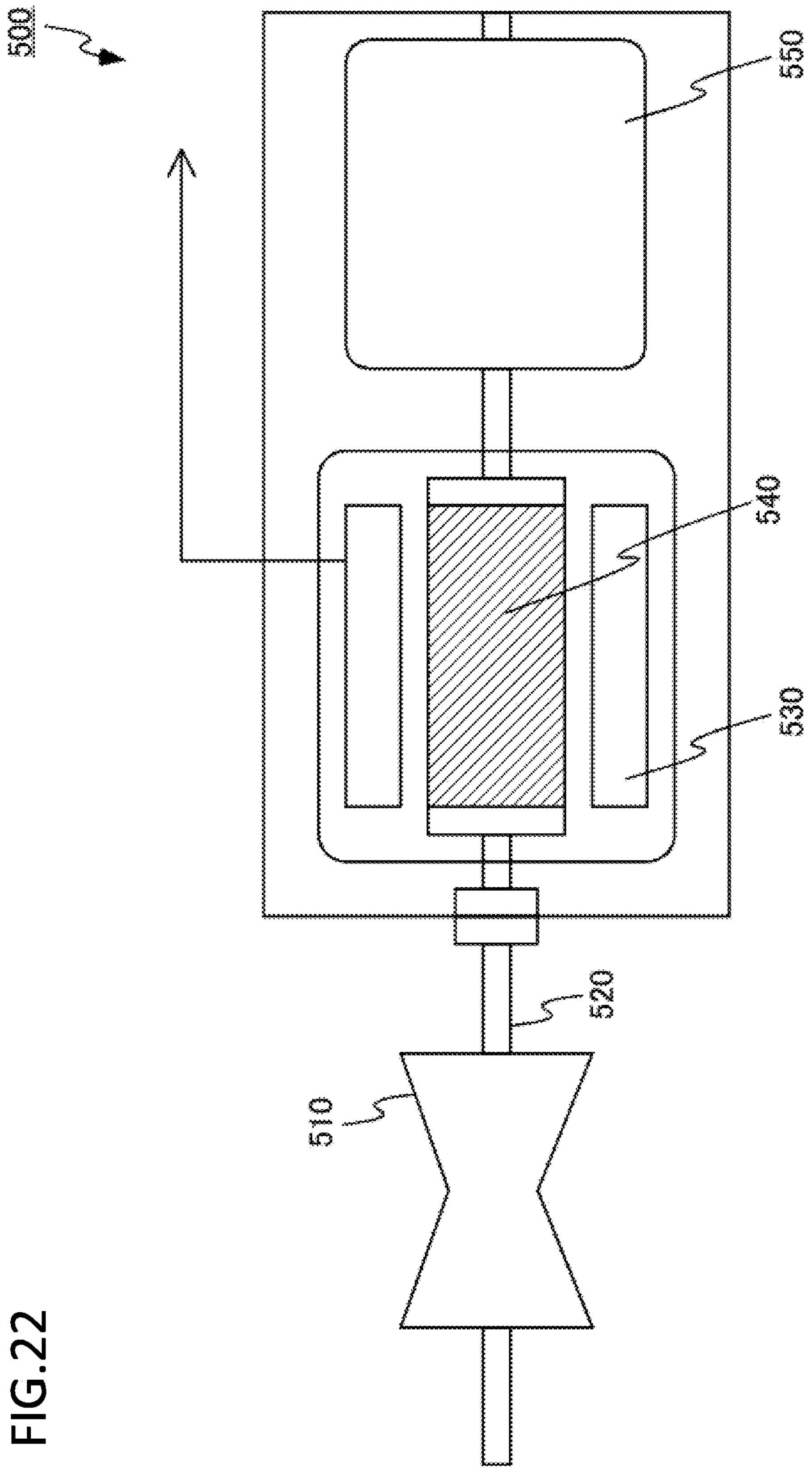
FIG. 22 is a schematic diagram of a generator according to the second embodiment.

FIG. 22 is a schematic diagram of a generator according to the second embodiment. FIG. 22 shows an exemplary conceptual diagram of a generator 500 as an example of the rotating electric machine. The generator 500 comprises either or both of a second stator (magneto stator) 530 that uses the magnetic composite material of the first embodiment as the core; and a second rotor (rotator) 540 that uses the magnetic composite material of the first embodiment as the core. In FIG. 22, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not shown in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not shown in the diagram, and a main transformer that is not shown in the diagram. Meanwhile, in the second rotor, an electrostatic charge is generated due to an axial current resulting from the static electricity from the turbine or from power generation. Therefore, the generator comprises a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

Figure 23:
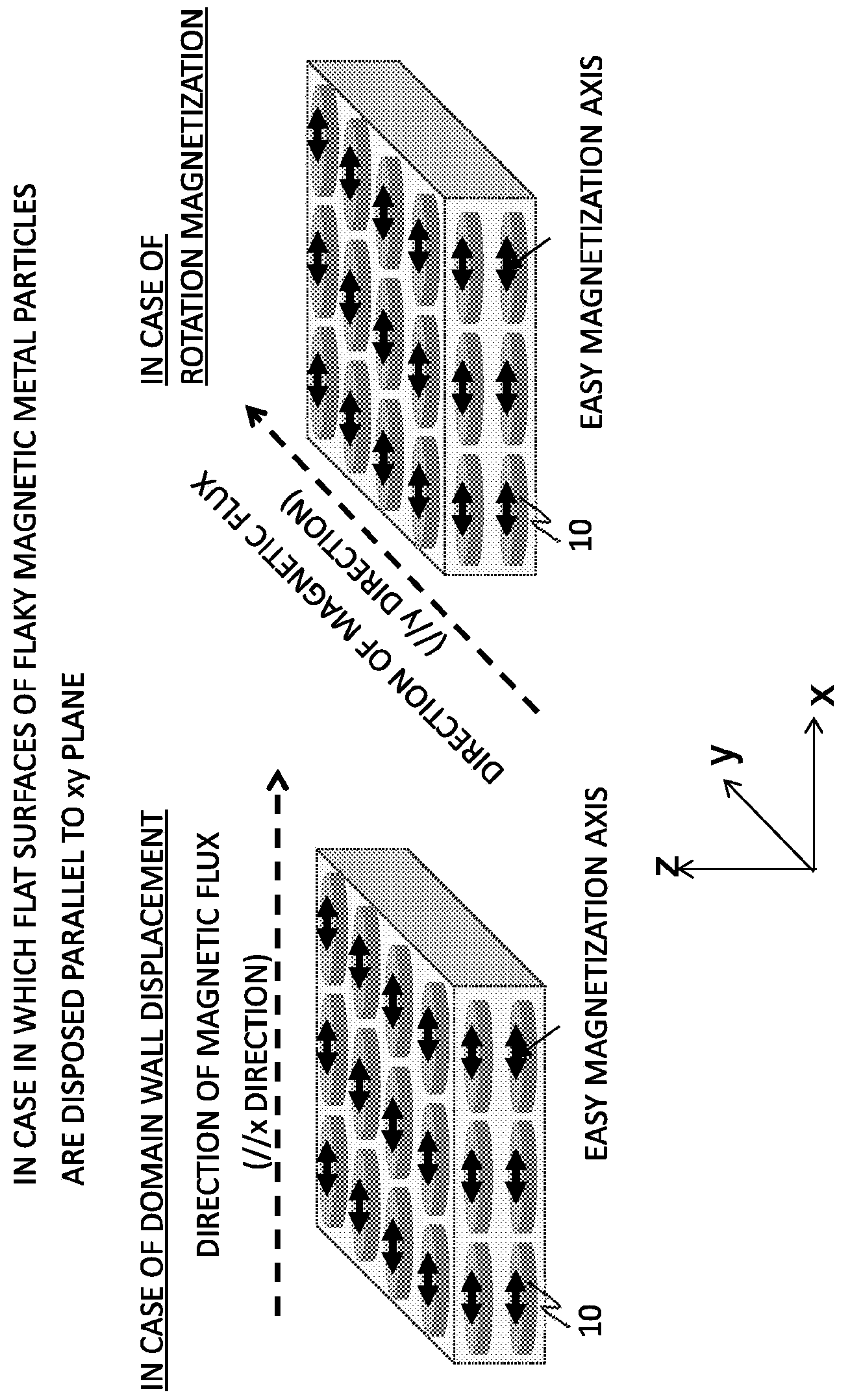
FIG. 23 is a conceptual diagram showing the relation between the direction of the magnetic flux and the direction of disposition of the magnetic composite material.

FIG. 23 is a conceptual diagram showing the relation between the direction of the magnetic flux and the direction of disposition of the magnetic composite material. FIG. 23 describes preferred examples of the relation between the direction of the magnetic flux and the direction of disposition of the magnetic composite material. First, for both of the domain wall displacement type and the rotation magnetization type, it is preferable that the flat surfaces of the flaky magnetic metal particles included in a magnetic composite material are disposed in a direction in which the flat surfaces are parallel to one another as far as possible are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. Thereby, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. Thereby, the system can be used in a direction in which coercivity is further decreased, and therefore, the hysteresis loss can be reduced, which is preferable. That is, it is preferable to understand the magnetization characteristics of a magnetic composite material, determine whether the magnetic composite material is of the domain wall displacement type or the rotation magnetization type (method for determination is as described above), and then dispose the magnetic composite material as shown in FIG. 23. In a case in which the direction of the magnetic flux is complicated, it may be difficult to dispose the magnetic composite material perfectly as shown in FIG. 23; however, it is preferable to dispose the magnetic composite material as shown in FIG. 23 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a magnetic composite material to be applied to these systems and device apparatuses, the magnetic composite material is allowed to be subjected to various kinds of processing. For example, in the case of a sintered body, the magnetic composite material is subjected to mechanical processing such as polishing or cutting; and in the case of a powder, the magnetic composite material is mixed with a resin such as an epoxy resin or polybutadiene. If necessary, the magnetic composite material is further subjected to a surface treatment. Also, if necessary, a coil treatment is carried out.

When the system and device apparatus of the present embodiment are used, a motor system, a motor, a potential transformer, a transformer, an inductor, and a generator, all having excellent characteristics (high efficiency and low losses), can be realized.

While certain embodiments have been described, these embodiments have been presented by way of example only, and are not intended to limit the scope of the inventions. Indeed, a magnetic composite material and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A rotating electric machine, comprising:

a magnetic composite material comprising: (i) a plurality of flaky magnetic metal particles; and (ii) an intercalated phase; and a plate-shaped reinforcing material, wherein the magnetic composite material has a longitudinal direction along a longest dimension, a first plane parallel to the longitudinal direction, and the first plane is in contact with the plate-shaped reinforcing material, wherein each of the flaky magnetic metal particles includes a flat surface and a magnetic metal phase containing at least one first element selected from the group consisting of iron (Fe), cobalt (Co), and nickel (Ni), wherein the flaky magnetic metal particles have an average thickness in a range of from 10 nm to 100 μm, wherein an average value of a ratio of an average length in the flat surface to a thickness in the flaky magnetic metal particles is in a range of from 5 to 10,000, wherein the flat surfaces are oriented and are approximately perpendicular to the plate-shaped reinforcing material, wherein the intercalated phase exists between the flaky magnetic metal particles and contains at least one second element selected from the group consisting of oxygen (O), carbon (C), nitrogen (N), and fluorine (F), wherein the flat surfaces are disposed to be approximately perpendicular to a gap surface between a stator and a rotor of the rotating electric machine, and wherein a plurality of the flat surfaces of the flaky magnetic metal particles are in a range of 40° or less.

2. The rotating electric machine of claim 1, wherein the plate-shaped reinforcing material has a first reinforcing material part and a second reinforcing material part, and the magnetic composite material is disposed between the first reinforcing material part and the second reinforcing material part.

3. The rotating electric machine of claim 1, wherein an adhesive layer is disposed between the plate-shaped reinforcing material and the magnetic composite material.

4. The rotating electric machine of claim 1, wherein the flat surfaces have the difference in coercivity depending on a direction in a second plane, different from the first plane, and wherein a proportion of the difference in coercivity on the basis of direction within the a second plane is 1% or higher.

5. The rotating electric machine of claim 1, wherein the flaky magnetic particles further comprise at least one additive element selected from the group consisting of boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y).

6. The rotating electric machine of claim 1, wherein the flat surface of each of the flaky magnetic particles has either or both of a plurality of concavities and a plurality of convexities, the concavities or the convexities being arranged in a first direction, having a width of 0.1 μm or more and a length of 1 μm or more, and having an aspect ratio of 2 or higher.

7. The rotating electric machine of claim 1, wherein the flaky magnetic particles have a lattice strain of from 0.01% to 10%.

8. The rotating electric machine of claim 1, wherein at least a portion of the surface of the flaky magnetic particles is covered with a coating layer having a thickness of from 0.1 nm to 1 μm and containing at least one of the second elements selected from the group consisting of oxygen (O), carbon (C), nitrogen (N), and fluorine (F).

9. The rotating electric machine of claim 1, wherein the intercalated phase contains a polyimide resin.

10. The rotating electric machine of claim 1, wherein the plate-shaped reinforcing material is not disposed at a position close to the gap surface.

11. The rotating electric machine of claim 1, wherein 50% or more of the flat surfaces of the flaky magnetic metal particles are in a range of 40° or less of perpendicular to the plate-shaped reinforcing material.

12. The rotating electric machine of claim 1, wherein the flat surfaces of the flaky magnetic metal particles are in a range of 40° or less.

* * * * *